(12) United States Patent
Hayashi et al.

(10) Patent No.: US 10,633,131 B2
(45) Date of Patent: Apr. 28, 2020

(54) BINDING MACHINE FOR GARDENING

(71) Applicant: MAX CO., LTD., Tokyo (JP)

(72) Inventors: Susumu Hayashi, Tokyo (JP); Satoshi Taguchi, Tokyo (JP); Hajime Takemura, Tokyo (JP)

(73) Assignee: MAX CO., LTD., Tokyo (JP)

( * ) Notice: Subject to any disclaimer, the term of this patent is extended or adjusted under 35 U.S.C. 154(b) by 0 days.

(21) Appl. No.: 15/622,177

(22) Filed: Jun. 14, 2017

(65) Prior Publication Data

US 2017/0361958 A1  Dec. 21, 2017

(30) Foreign Application Priority Data

Jun. 15, 2016 (JP) .................. 2016-119280

(51) Int. Cl.
*B65B 13/16* (2006.01)
*B65B 13/18* (2006.01)
*B65B 13/34* (2006.01)
*B65B 13/02* (2006.01)
(Continued)

(52) U.S. Cl.
CPC .............. *B65B 13/16* (2013.01); *A01G 17/08* (2013.01); *A01G 17/085* (2013.01);
(Continued)

(58) Field of Classification Search
CPC ............ B65H 35/0033; B65H 35/0026; B65B 13/16; B65B 13/345; B65B 13/025;
(Continued)

(56) References Cited

U.S. PATENT DOCUMENTS 3,762,621 A * 10/1973 Nishikawa ........... A01G 17/085
227/124
4,316,760 A * 2/1982 Satomi .................. B65B 27/105
100/17

(Continued)

FOREIGN PATENT DOCUMENTS

EP       A1-1114578      7/2001
EP       A1-2936972      10/2015
(Continued)

OTHER PUBLICATIONS

Nakajima et al. "JP 2009/153418, machine translation", published Jul. 16, 2009 (Year: 2009).*

(Continued)

*Primary Examiner* — Alex B Efta
(74) *Attorney, Agent, or Firm* — Faegre Drinker Biddle & Reath LLP

(57) ABSTRACT

A binding machine for gardening includes a main handle, a clincher arm, a tape guide, a tape gripping device and a cutting blade. The clincher arm is rotatably attached to the main handle. The tape guide is configured to draw out and guide a tape at a front end portion of the main handle. The tape gripping device is configured to grip an end portion of the tape drawn out from the tape guide, at a front end portion of the clincher arm. The cutting blade is configured to cut the tape. The tape guide is movably provided such that a position of the tape guide when the tape gripping device operates to grip the end portion of the tape and a position of the tape guide when the cutting blade operates to cut the tape are different from each other.

9 Claims, 24 Drawing Sheets

(51) Int. Cl.
*A01G 17/18* (2006.01)
*A01G 17/08* (2006.01)
*A01G 9/12* (2006.01)

(52) U.S. Cl.
CPC ............ *B65B 13/025* (2013.01); *B65B 13/18* (2013.01); *B65B 13/345* (2013.01)

(58) Field of Classification Search
CPC ..... B65B 13/185; B65B 13/305; B65B 11/50; B65B 11/52; B65B 27/105; B65B 27/10
See application file for complete search history.

(56) References Cited

U.S. PATENT DOCUMENTS

| | | | |
|---|---|---|---|
| 6,968,988 | B2 * | 11/2005 | Hayashi ............... A01G 17/085 227/108 |
| 2004/0237805 | A1 | 12/2004 | Hayashi et al. |
| 2007/0034338 | A1 | 2/2007 | Ogawa |
| 2015/0181810 | A1 * | 7/2015 | Cho ..................... A01G 17/085 227/120 |

FOREIGN PATENT DOCUMENTS

| | | | |
|---|---|---|---|
| JP | S60-251007 | A | 12/1985 |
| JP | 2003-341613 | A | 12/2003 |
| JP | 2008-072928 | A | 4/2008 |
| JP | 2008-253194 | A | 10/2008 |
| JP | 2009153418 | A * | 7/2009 |
| SU | 686679 | A1 | 9/1979 |

OTHER PUBLICATIONS

EP ESSR issued in EP 17175961.6 on Nov. 8, 2017.
EP Office Action dated Aug. 9, 2018 from corresponding European patent application No. 17175961.6 (6 pages).

* cited by examiner

BINDING MACHINE FOR GARDENING

CROSS-REFERENCE TO RELATED APPLICATION

This application is based on and claims priority under 35 USC119 from Japanese Patent Application No. P22016-119280 filed on Jun. 15, 2016.

TECHNICAL FIELD

The present invention relates to a binding machine for gardening that is used for guiding/binding work in agricultural crop cultivation.

BACKGROUND

In the related art, a binding machine for gardening is used for guiding/binding work at the time of cultivation of agricultural crops. Specifically, the binding machine for gardening is used to bind plant vines and stems to poles or nets in cultivation of agricultural crops such as cucumbers, grapes, or tomatoes.

For example, this type of binding machine for gardening includes a main handle capable of drawing out a tape from a front end portion and a clincher arm rotatable with respect to the main handle. When an operation handle of the binding machine for gardening is lightly grippedgripped, the clincher arm rotates in a closing direction with respect to the main handle, and a tape gripping device provided at a front end portion of the clincher arm grips the tape drawn out from the front end portion of the main handle. When the squeezing of the handle is released in this state, the clincher arm rotates in an opening direction with respect to the main handle, and the tape is drawn out. When the tape is drawn out and the tape is stretched between the clincher arm and the main handle, the agricultural crops and poles are pressed against the drawn-out tape, and the agricultural crops and the poles are inserted between the clincher arm and the main handle. When the handle is further grippedgripped again in this state, the clincher arm rotates in the closing direction with respect to the main handle, and a tape loop is formed. When the handle is further grippedgripped, both ends of the tape loop are bound by a staple, the ends of the tape loop are cut by a cutter, and thus the binding is completed.

Such a binding machine for gardening is disclosed in JP-A-2003-341613 in which scraps are not generated when a tape is cut with a cutter. In the binding machine for gardening, since a tape support plate for supporting a front end portion of the tape is disposed in front of a cutter blade of a driver handle, the front end portion of the tape is not cut (only one part on a root side of a tape loop is cut), and thus scraps are not generated.

In a structure disclosed in JP-A-2003-341613, in view of a positional relation of a tape guide that is provided on a main handle to drawingly guide the tape and a tape gripping device, when the tape guide and the tape gripping device are too separated from each other, a distance from an end portion of the tape supported by the tape guide to the tape gripping device increases, and thus the tape gripping device may increasingly fail to grip the tape. For this reason, it is desirable to make the distance between the tape gripping device and the tape guide as short as possible, but if the distance between them is made excessively short, the front end portion of the tape protruding drawingly from the tape guide becomes short when the tape is cut with the cutter disposed between the tape guide and the tape gripping device. That is, there is a problem that a gripping margin for use in the next and subsequent tape gripping operation becomes short.

In the structure disclosed in JP-A-2003-341613, a difference in height between the tape gripping device and the tape guide is provided in order to solve the problem described above, the tape is obliquely drawn from the tape guide, and the obliquely drawn tape is cut with the cutter. Thus, the distance between the tape gripping device and the tape guide is shortened as much as possible, and the gripping margin for use in the next and subsequent tape gripping operation can be made longer.

SUMMARY

In the structure disclosed in JP-A-2003-341613, however, the obliquely drawn tape is cut in a state of being brought into contact with the cutter, and thus an insertion angle of the cutter with respect to the tape becomes shallow, whereby defective cutting may occur. Particularly, the defective cutting is likely to occur when the tape is easy to elongate at a high temperature, when the tape is hardened at a low temperature, and the cutter blade is worn.

Therefore, the invention is to provide a binding machine for gardening that can take a long a gripping margin for use in the next and subsequent tape gripping operation while preventing the gripping failure of a tape gripping device and hardly causes defective cutting of a tape.

The invention has been made to solve the problems, and is characterized by the following.

(1) A binding machine for gardening comprising:
a main handle;
a clincher arm that is rotatably attached to the main handle;
a tape guide that is configured to draw out and guide a tape at a front end portion of the main handle;
a tape gripping device that is configured to grip an end portion of the tape drawn out from the tape guide, at a front end portion of the clincher arm; and
a cutting blade that is configured to cut the tape, wherein
the tape guide is movably provided such that a position of the tape guide when the tape gripping device operates to grip the end portion of the tape and a position of the tape guide when the cutting blade operates to cut the tape are different from each other.

(2) The binding machine for gardening according to (1), wherein
the tape guide is swingably attached to the main handle.

(3) The binding machine for gardening according to (1) or (2), wherein
the tape guide is configured to move while holding the tape so as to apply a tension to the tape to be cut by the cutting blade.

(4) The binding machine for gardening according to (3), wherein
the tape gripping device includes a gripping member that operates to grip the tape, and
the tape guide is configured to be guided and to move by the gripping member.

(5) The binding machine for gardening according to (3), wherein
the tape gripping device includes a gripping member that operates to grip the tape, and
the tape guide is configured to move while being guided to an inclined surface of the gripping member toward a V-shaped portion of the gripping member, and to further move together with the gripping member after being engaged with a V-shaped portion.

(6) The binding machine for gardening according to (5), further comprising:
a restriction unit that restricts movement of the gripping member when the tape guide moves and is guided to the inclined surface of the gripping member.

(7) The binding machine for gardening according to any one of (1) to (6), wherein
the cutting blade moves in conjunction with the tape guide.

(8) The binding machine for gardening according to any one of (1) to (7), wherein
the cutting blade is configured to be brought into vertical contact with the tape when the cutting blade cuts the tape.

According to the above (1), the tape guide is movably attached such that the position when the tape gripping device operates to grip the end portion of the tape and the position when the cutting blade operates to cut the tape are different from each other. According to this configuration, the distance between tape gripping device and the tape guide can be made short as much as possible when the tape is gripped by the tape gripping device, so that it is possible to prevent the gripping failure of the tape gripping device. In addition, the distance between the tape gripping device and the tape guide can be made long when the tape is cut by the cutting blade, so that it is possible to cut the tape after securing a sufficient gripping margin from a drawing port. Therefore, it is possible to surely grip the tape by the tape gripping device in the work after the cutting. Further, since the tape is not necessary to be disposed obliquely with respect to the cutting blade in order to secure the gripping margin as in the related art, the tape can be substantially brought into vertical contact with the cutting blade, and the defective cutting of the tape can be prevented.

According to the above (2), the tape guide is swingably attached to the main handle. According to this configuration, the tape can be guided toward the front end portion of the tape guide from the tape guide rocking shaft, and even when the tape guide rocks, since the tape guide rocking shaft on the pulling out side of the tape does not move, the tape is not loosened or drawn along with the movement of the tape guide. Accordingly, it is possible to stably hold the tape even when the tape guide moves.

According to the above (3), the tape guide is configured to move while holding the tape so as to apply a tension to the tape cut by the cutting blade. According to this configuration, when the tape is cut by the cutting blade, the tape guide moves not only to secure the gripping margin but also to apply the tension to the tape, whereby the tape can be easily cut and the defective cutting of the tape can be prevented.

According to the above (4) and (5), the tape guide is configured to move while being guided to the inclined surface of the gripping member, and to further move together with the gripping member after being engaged with the V-shaped portion ahead of the inclined surface. According to this configuration, since the gripping member moves together with the tape guide, the gripping member can be moved to the initial position (a state where the tape is not gripped) using the movement of the tape guide. Moreover, since the gripping member does not move until the tape guide reaches the V-shaped portion, it is possible to maintain a state where the tape is gripped just before the cutting.

According to the above (6), the restriction unit is further provided to restrict the movement of the gripping member when the tape guide moves while being guided to the inclined surface of the gripping member. According to this configuration, when the tape guide moves along the inclined surface of the gripping member, it is possible to prevent the gripping member from moving unintentionally.

According to the above (7), the cutting blade moves in conjunction with the tape guide. According to this configuration, the cutting blade can hardly be damaged, and the defective cutting can be prevented. That is, if the tape is cut by the fixed cutting blade, when the tape guide moves to pull out the tape, the tape guide moves to rub the surface of the tape with the cutting edge of the cutting blade, whereby the cutting blade may be damaged, or the defective cutting may occur. In this regard, when the cutting blade moves together with the tape guide, the change in the relative position between the cutting edge of the cutting blade and the surface of the tape can be reduced, and thus the above-described problem can hardly occur.

DETAILED DESCRIPTION

An embodiment of the invention will be described with reference to the drawings. In the following description, the front means a direction (a right direction in FIG. 2) in which a binding machine for gardening 10 faces an object S to be bound at the time of use, and the rear means a direction (a left direction in FIG. 2) opposite to the front.

Figure 1:
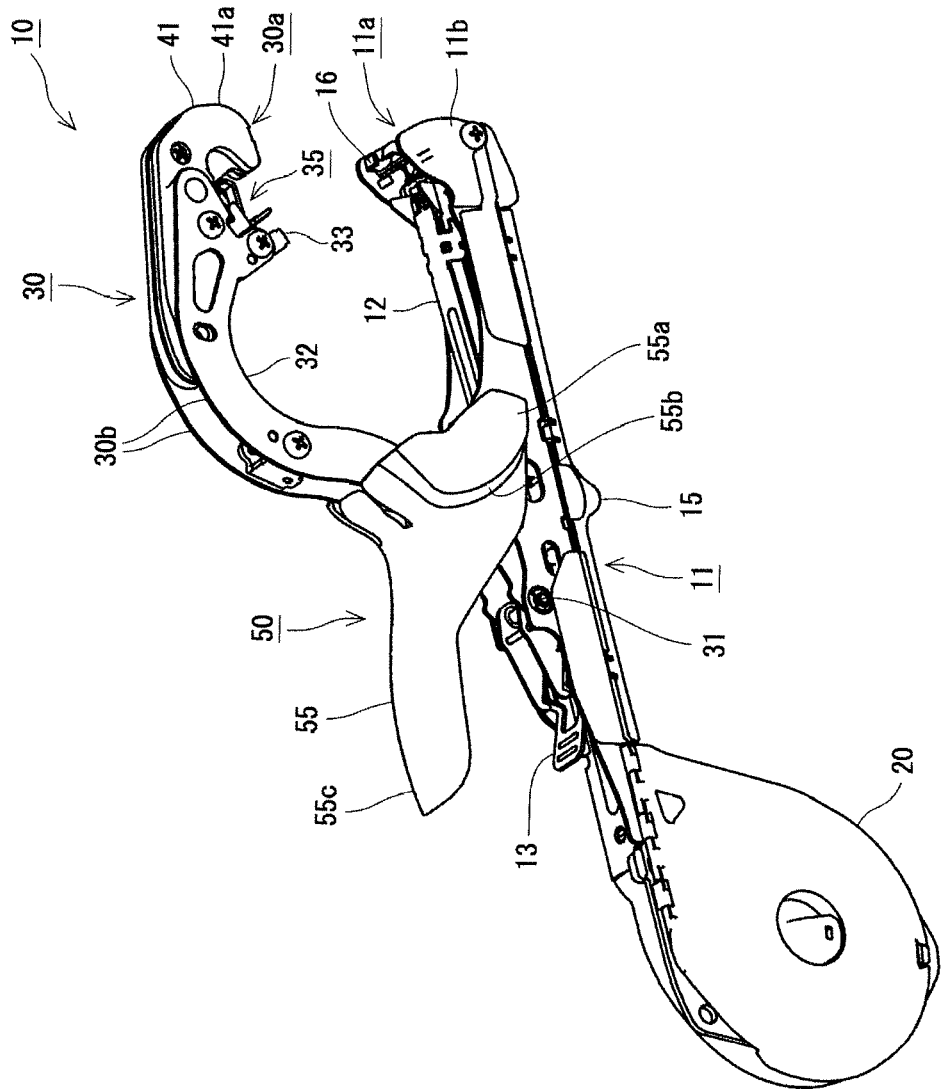
FIG. 1 is an external perspective view of a binding machine for gardening.
Figure 2:
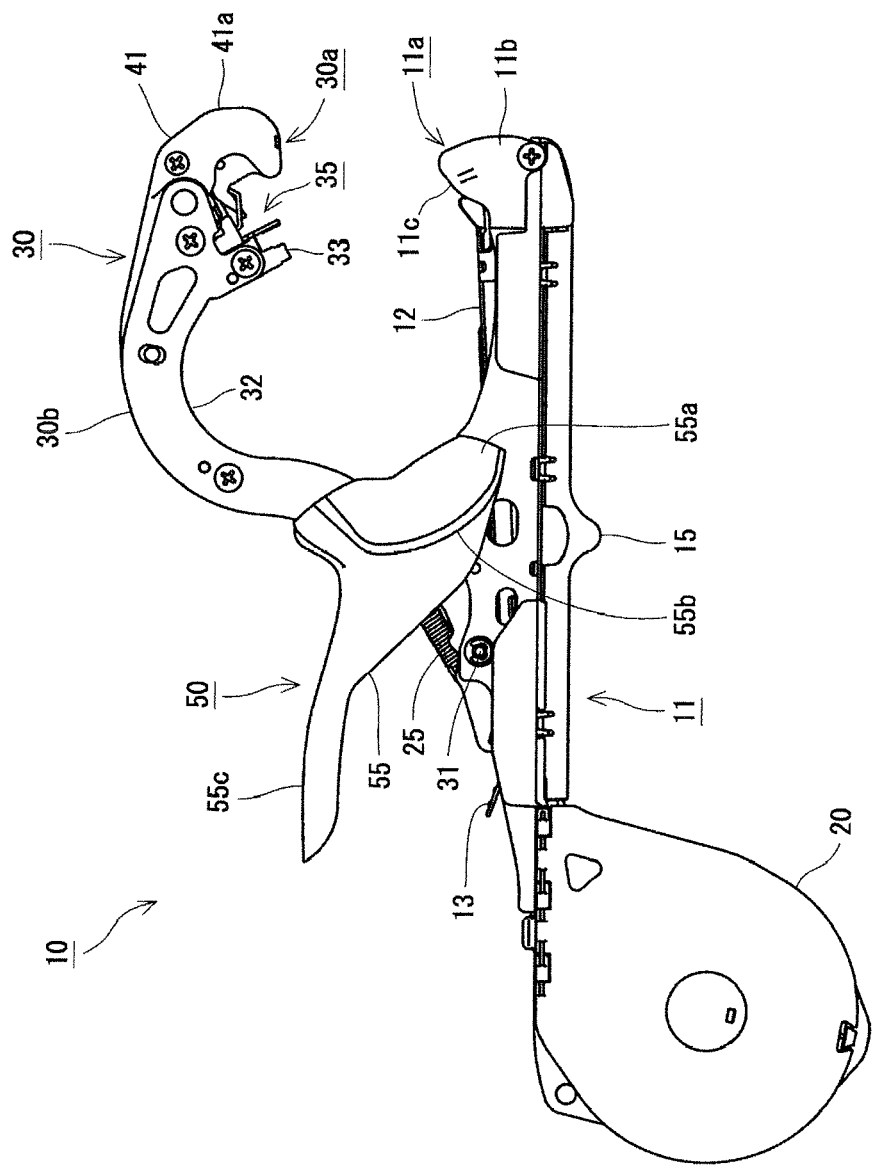
FIG. 2 is a side view of the binding machine for gardening and illustrates a state in which a clincher arm is opened with respect to a main handle.
Figure 3:
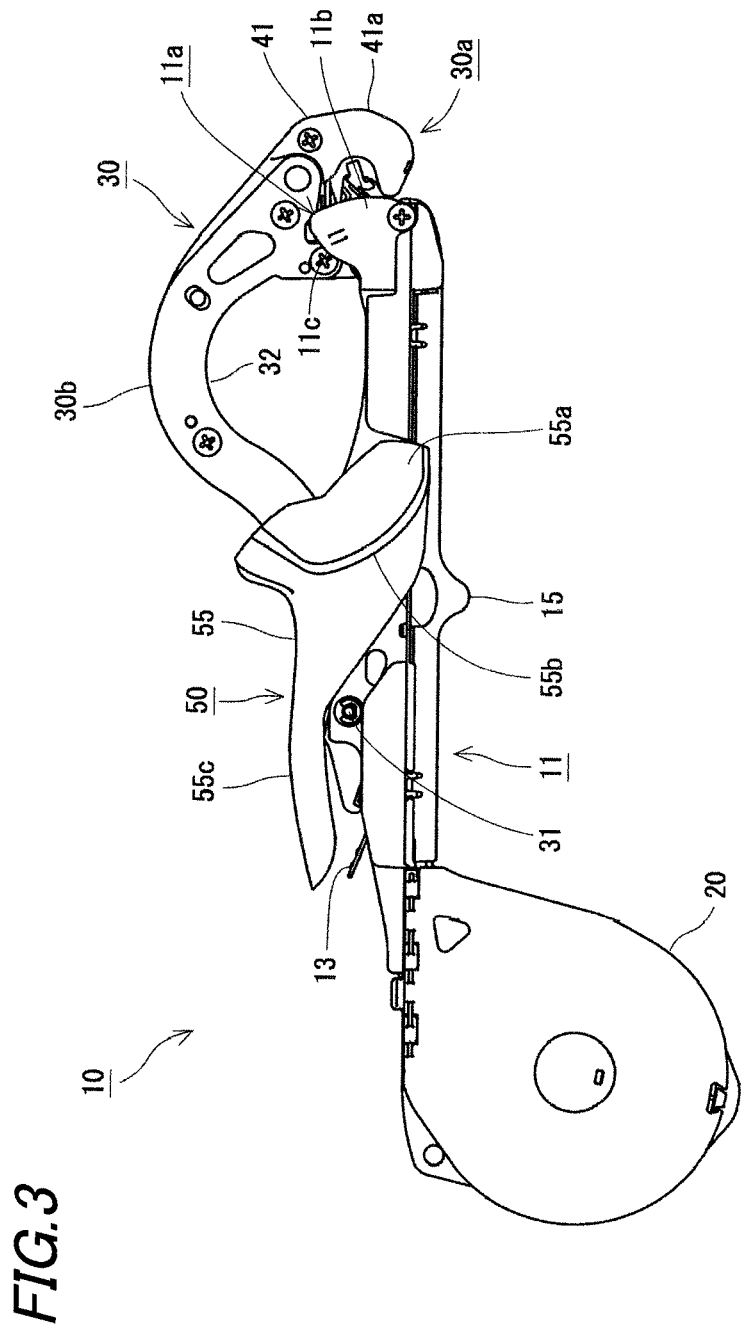
FIG. 3 is a side view of the binding machine for gardening and illustrates a state in which the clincher arm is completely closed with respect to the main handle.
Figure 4:
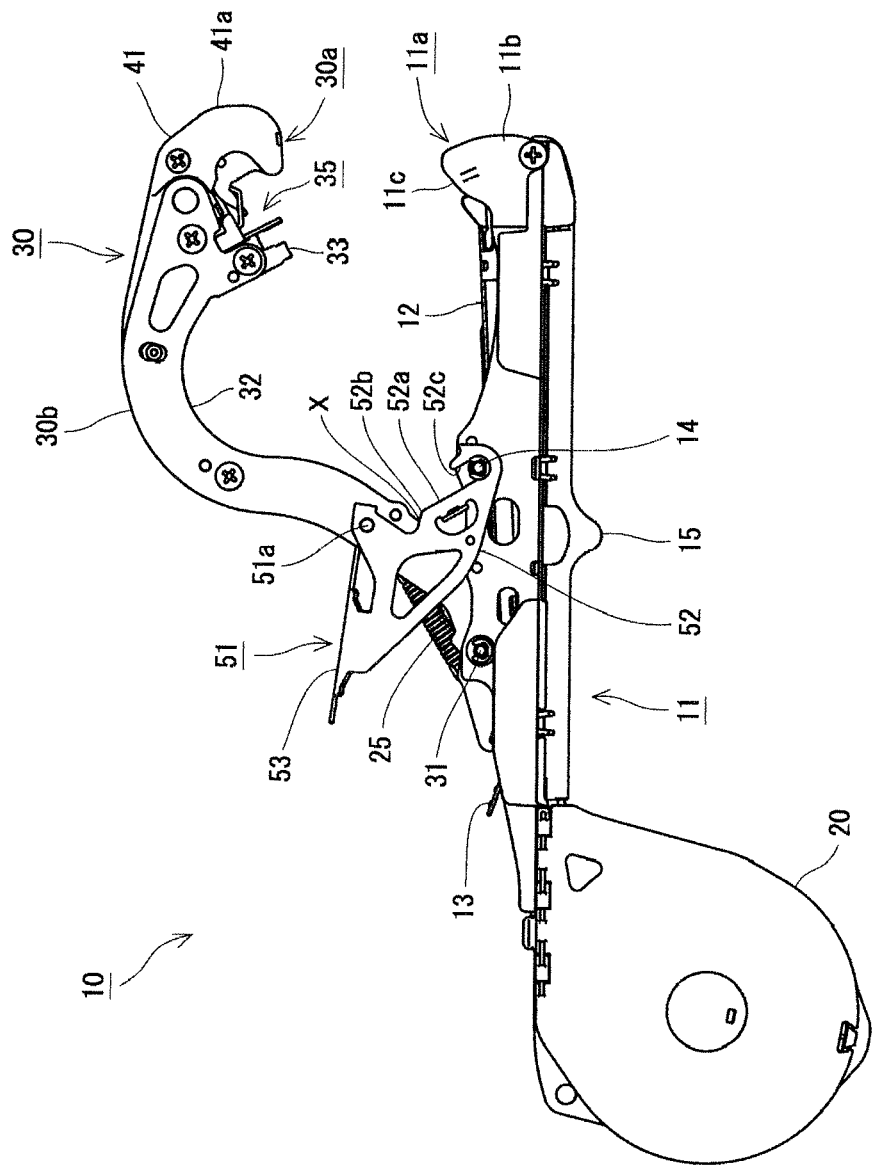
FIG. 4 is a side view of the binding machine for gardening from which a cover member of an operation handle is removed and illustrates a state in which the clincher arm is opened with respect to the main handle.

As illustrated in FIGS. 1 to 3, the binding machine for gardening 10 according to the embodiment is used for guiding/binding work in agricultural crop cultivation includes an elongated main handle 11 that is linearly formed, a clincher arm 30 that is rotatably attached to the main handle 11, and an operation handle 50 that is rotatably attached to the clincher arm 30. As illustrated in FIG. 4, the clincher arm 30 is constantly urged by a tension spring 25, and is in an open state with respect to the main handle 11 in normal times. When the operation handle 50 and the main handle 11 are gripped from this state, as illustrated in FIG. 3, the clincher arm 30 is configured to rotate in a closing direction with respect to the main handle 11. Then, when the clincher arm 30 rotates in the closing direction up to a predetermined position with respect to the main handle 11, in order to draw out a tape 60 from a front end portion 11a of the main handle 11, a gripping operation is executed to grip the tape 60 at a front end portion 30a of the clincher arm 30 and a binding operation is executed to bundle the object S to be bound with the tape 60 and to cut the tape 60 when the clincher arm 30 further rotates in the closing direction from the predetermined position with respect to the main handle 11 and is thus completely closed (closed state). In the gripping operation, that is, the clincher arm 30 rotates with respect to the main handle 11 up to a predetermined position without squeezing the handle up to a completely closed position. Meanwhile, in the binding operation, the clincher arm 30 further rotates in the closing direction from the predetermined position with respect to the main handle 11 by performing a squeezing operation of the handle up to the completely closed position. In this way, the gripping operation and the binding operation can be switched by the end point position of the squeezing operation. As will be described in detail below, in the embodiment, movement of the clincher arm 30 is restricted so as not to further rotate in the closing direction from the predetermined position when the gripping operation is performed, whereas the restriction is canceled when the binding operation is performed. For this reason, even if a worker does not recognize the end point position of the squeezing operation, when the operation of squeezing the depth side is performed, the gripping operation and the binding operation are automatically performed in turns.

Figure 19:
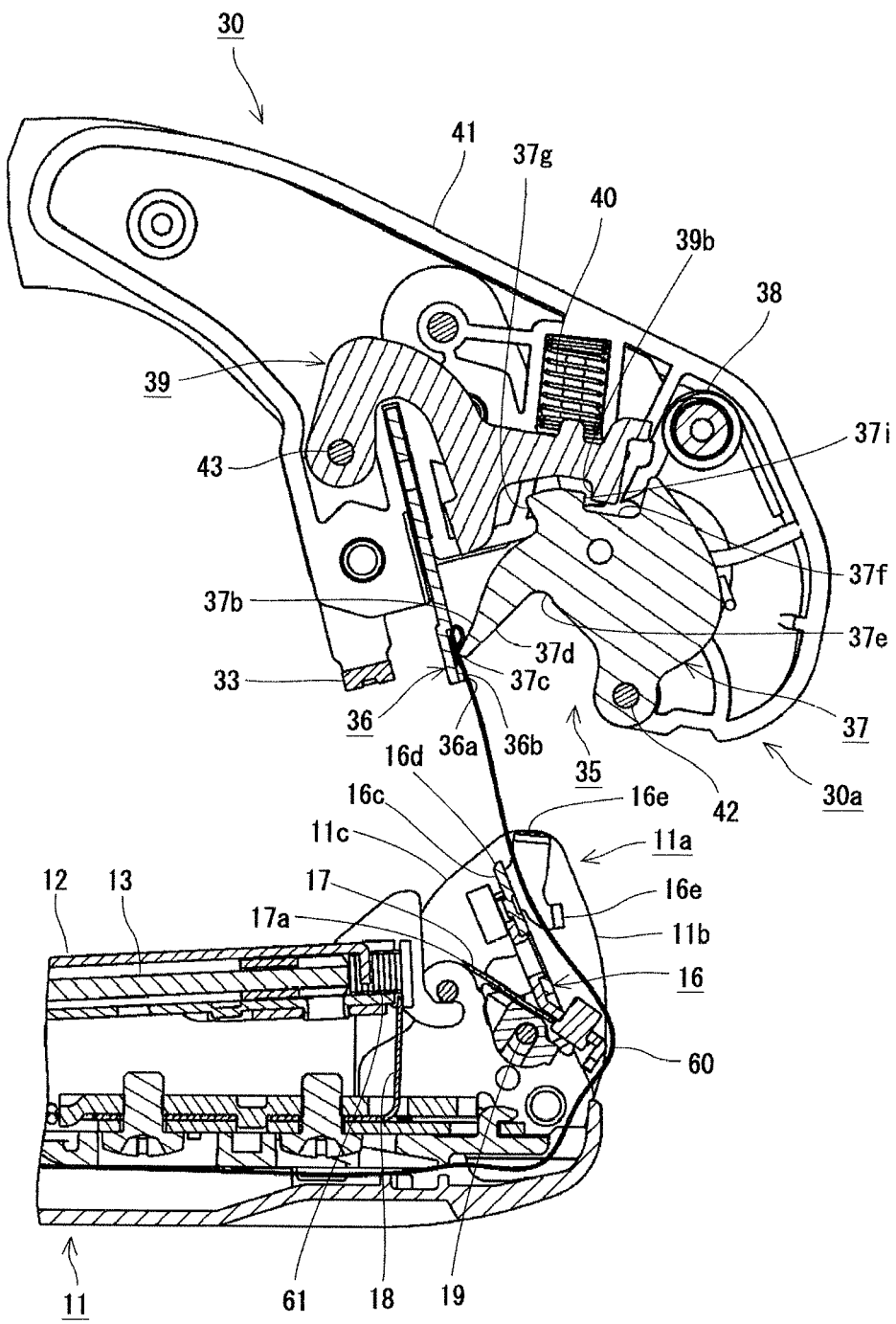
FIG. 19 is a partially enlarged sectional view of the binding machine for gardening and illustrates a state in which a tape is gripped and drawn out by a tape gripping device.
Figure 22:
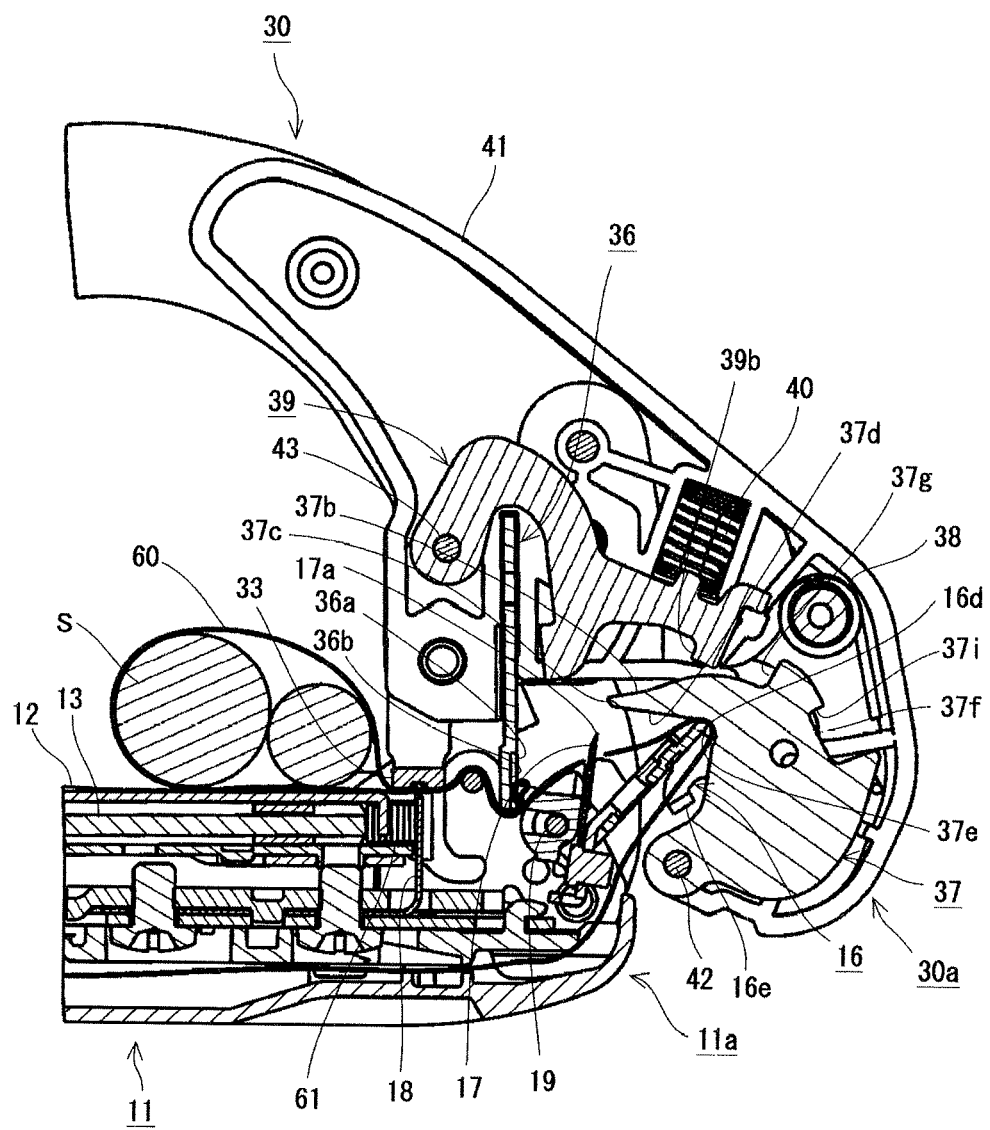
FIG. 22 is a partially enlarged sectional view of the binding machine for gardening and illustrates a state in which a tape is cut.

First, the handle is gripped, and the clincher arm 30 rotates in the closing direction with respect to the main handle 11, thereby binding the object S to be bound. Thus, the gripping operation is executed to grip the tape 60 at the front end portion 30a of the clincher arm 30. Thereafter, when the squeezing of the handle is released and thus the clincher arm 30 rotates in the opening direction with respect to the main handle 11, as illustrated in FIG. 19, the front end portion 30a of the clincher arm 30 and the front end portion 11a of the main handle 11 are separated from each other in a state where the tape 60 is gripped, and the tape 60 is in a state of being stretched between the clincher arm 30 and the main handle 11. The objects S to be bound such as seedlings or branches are introduced from the outside of the tape 60 stretched in this state, the handle is gripped again, and thus the clincher arm 30 rotates in the closing direction with respect to the main handle 11. Thus, as illustrated in FIG. 22, both ends of a tape loop for binding the objects S to be bound are bonded by a staple 61, and the tape 60 is cut (the binding operation is executed). In this manner, the gripping operation is executed in the first squeezing operation, and the binding operation is executed in the second squeezing operation. When the gripping operation and the binding operation are executed in turns, the objects S to be bound can be bound. In the embodiment, the staple 61 is used as a bonding unit for bonding the both ends of the tape loop, but the both ends of the tape loop may be bonded by adhesion or welding without being limited thereto.

As illustrated in FIG. 1 and the like, the main handle 11 is a bar-like member which is linearly formed, and is formed such that the tape 60 and the staple 61 can be formed along a longitudinal direction. A staple magazine 12, a pusher unit 13, a tape guide 16, a staple driver 18, and a tape magazine 20 are attached to the main handle 11.

The staple magazine 12 is a long member for accommodating the staple 61. As illustrated in FIG. 1 and the like, the staple magazine 12 is disposed along the longitudinal direction of the main handle 11, and can accommodate the staple 61 therein. As the staple 61 accommodated in the staple magazine 12, a plurality of U-shaped staples 61 bonded with an adhesive are used. The staple 61 accommodated in the staple magazine 12 is pushed toward the front end portion by the pusher unit 13 which will be described below. At the front end portion of the staple magazine 12, a long hole is provided to introduce the staple driver 18 which will be described below. In addition, the staple magazine 12 is attached to the main handle 11 so as to be rockable around a shaft provided at a rear end side.

Figure 6:
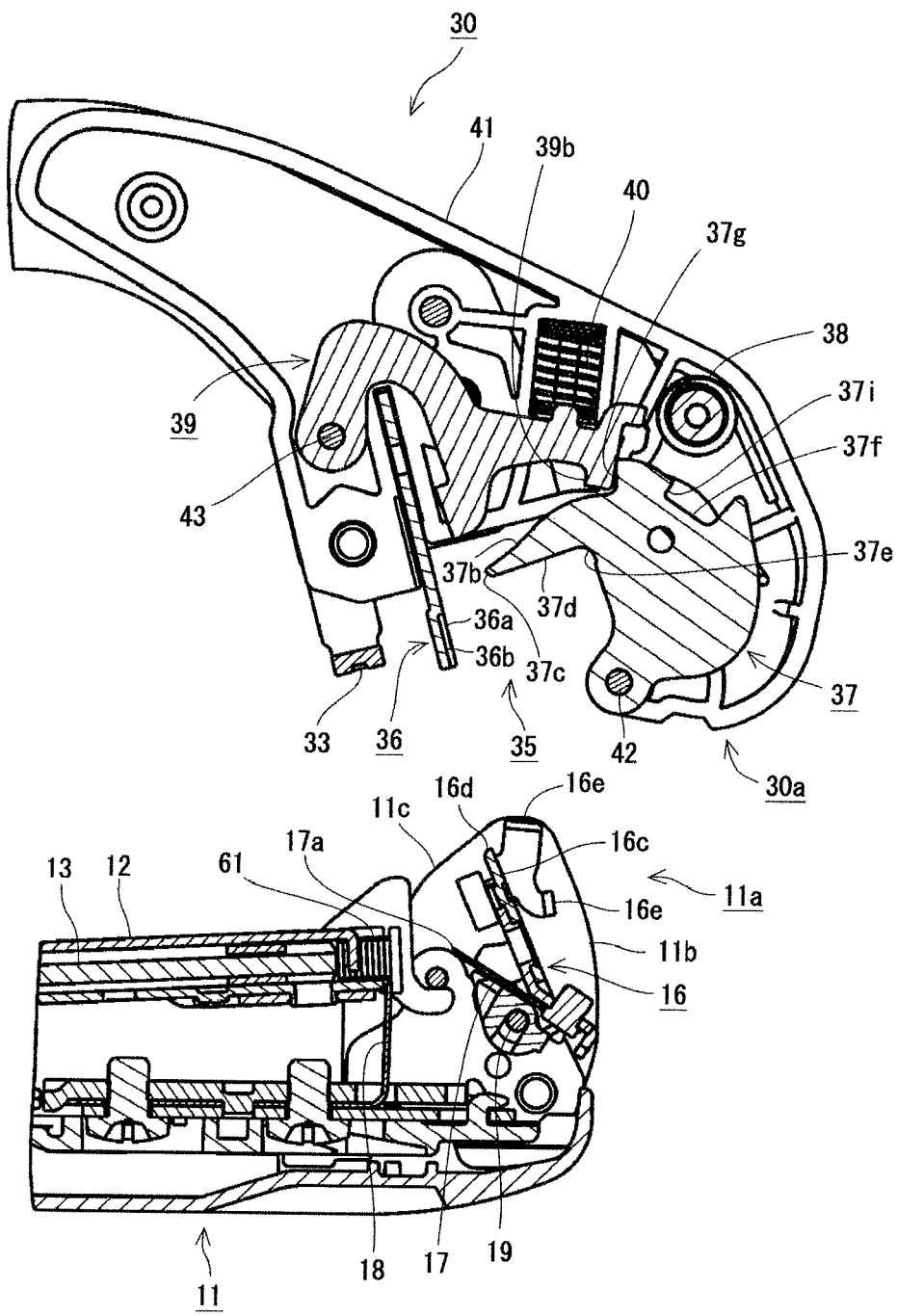
FIG. 6 is an enlarged sectional view of the vicinity of a front end portion of the binding machine for gardening.

As illustrated in FIG. 1 and the like, the pusher unit 13 is a member that can be inserted and attached to the staple magazine 12. As illustrated in FIG. 6 and the like, the pusher unit 13 urges the staple 61 accommodated in the staple magazine 12 toward the front. When the staple 61 is set in the staple magazine 12, the pusher unit 13 is drawn down to insert the staple 61 from the top of the staple magazine 12.

As illustrated in FIG. 6 and the like, the staple driver 18 is a plate fixed to the front end portion 11a of the main handle 11 so as to face the vicinity of the front end portion of the staple magazine 12. The staple driver 18 is formed to have substantially the same width as the staple 61 so that only one staple 61 can be ejected. When the clincher arm 30 rotates to the state of being completely closed with respect to the main handle 11, as illustrated in FIG. 22, the staple driver 18 enters into the staple magazine 12, thereby ejecting the leading staple 61 accommodated in the staple magazine 12. Specifically, when the clincher arm 30 moves in the closing direction, the clincher arm 30 pushes the staple magazine 12 to rock it toward the staple driver 18. As the staple magazine 12 rocks, the staple driver 18 enters into the staple magazine 12, thereby ejecting the staple 61. After penetrating through the tape 60, the ejected staple 61 is clinched by the clincher 33 to be described below, so that two legs thereof are refracted to embrace the tape 60 and thus bonded to an end 60a of the overlapped tape 60.

Figure 12:
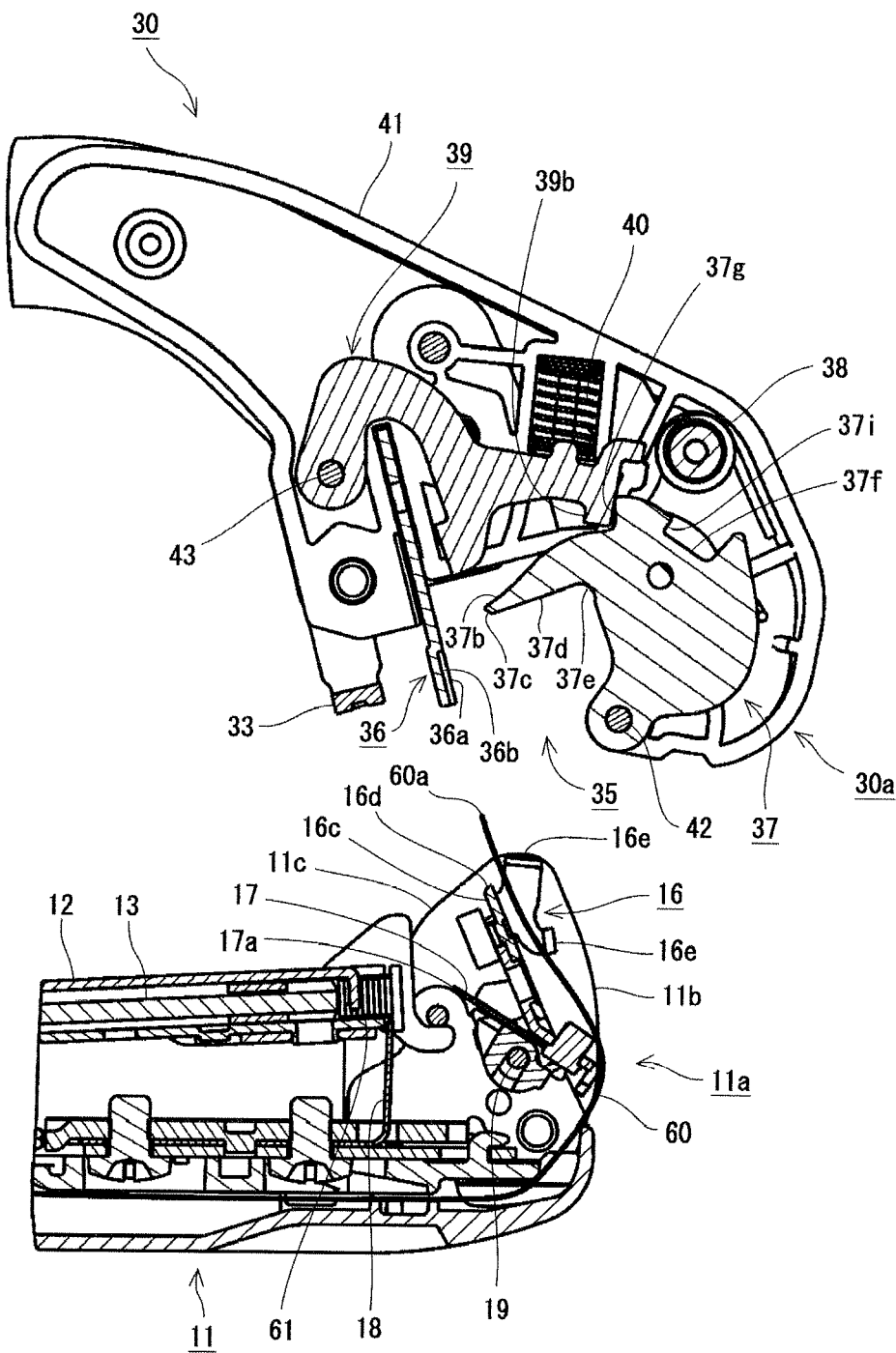
FIG. 12 is a partially enlarged sectional view of the binding machine for gardening and illustrates a state before a gripping operation is executed.
Figure 13:
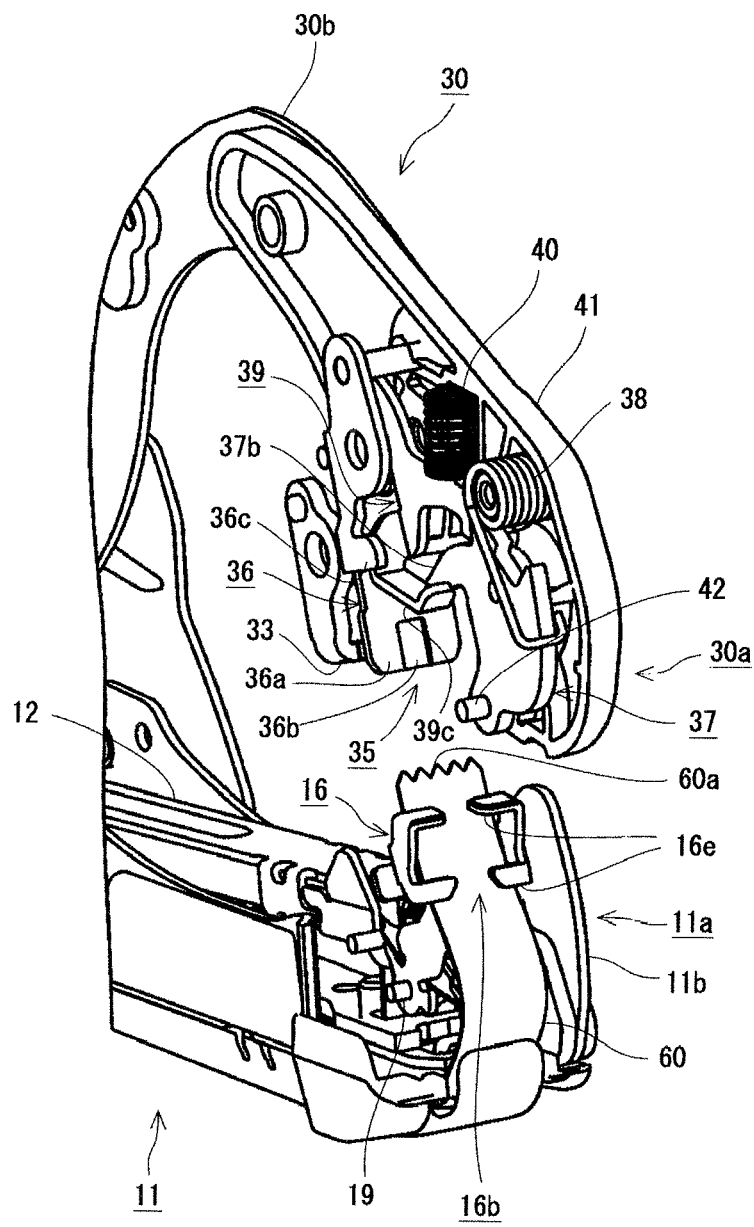
FIG. 13 is a partially enlarged perspective view of the binding machine for gardening and illustrates a state before the gripping operation is executed.

As illustrated in FIG. 1 and the like, the tape magazine 20 is provided continuously with a rear end of the main handle 11 to accommodate the tape 60. The tape magazine 20 is capable of accommodating the tape 60 wound in a reel shape, and has a lid which can be openable to take in and out the tape 60. The tape 60 accommodated in the tape magazine 20 is drawn out to the front end portion 11a of the main handle 11 along the main handle 11. In the tape 60 drawn out to the front end portion 11a of the main handle 11, as illustrated in FIGS. 12 and 13, the end 60a thereof is held by the tape guide 16 which will be described below.

Figure 7:
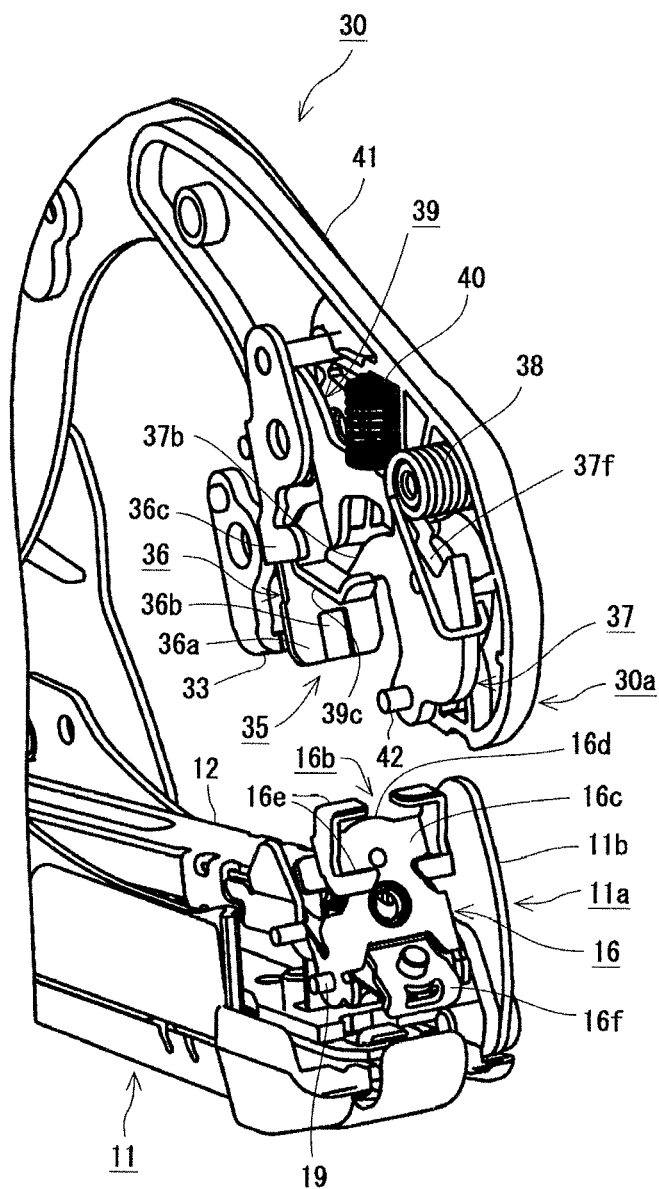
FIG. 7 is a perspective view illustrating an internal structure in the vicinity of the front end portion of the binding machine for gardening.

As illustrated in FIGS. 6 and 7, the tape guide 16 is disposed at the front end portion 11a of the main handle 11, and is attached so as to be rockable around a tape guide rocking shaft 19 provided in the main handle 11. The tape guide 16 has a guide path at a center thereof as illustrated in FIG. 13, the tape 60 being guided so as to be drawable through the guide path. The guide path of the tape guide 16 has such a shape as to cover four sides such as both sides, a front side, and a rear side of the tape 60, so that the inserted tape 60 is not detached. The tape 60 inserted through the guide path is drawn out from the front end portion and faces the clincher arm 30. The end 60a of the tape 60 is gripped by a tape gripping device 35, which will be described below, of the clincher arm 30, and is drawn out by a required amount.

Figure 8A:
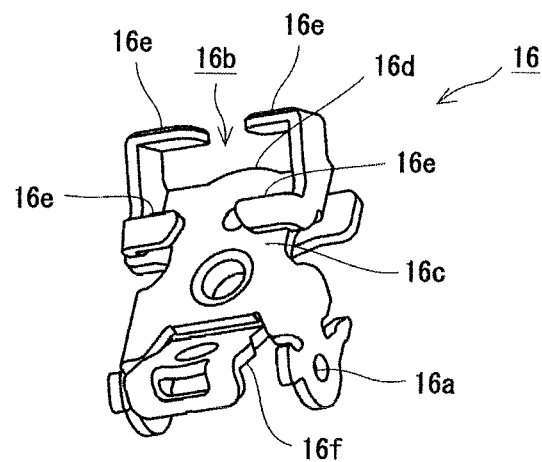
FIG. 8A is a perspective view of a tape guide as viewed from the front.
Figure 8B:
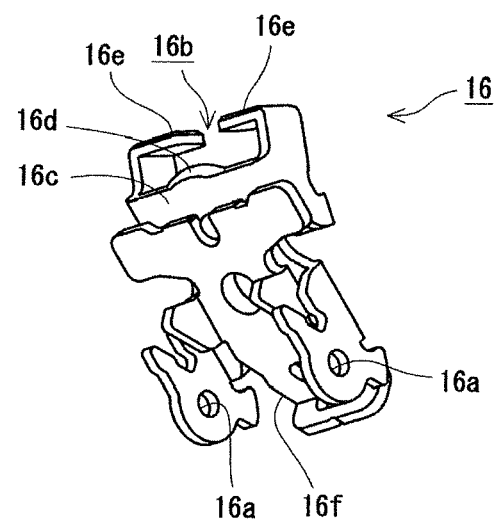
FIG. 8B is a perspective view of the tape guide as viewed from the rear.

As illustrated in FIGS. 8A and 8B, the tape guide 16 includes a rocking shaft hole 16a, a slit 16b, a back surface portion 16c, an abutment portion 16d, a tape holding portion 16e, and a cutting blade fitting portion 16f.

The rocking shaft hole 16a is a round hole through which the tape guide rocking shaft 19 penetrates. The rocking shaft hole 16a is provided at a lower part of the tape guide 16 (a side far from the clincher arm 30). The rocking shaft hole 16a is pivotally supported by the tape guide rocking shaft 19, and thus an end portion of the tape guide 16 facing the clincher arm 30 is rockable forward. Although not specifically illustrated, the tape guide 16 is constantly urged rearward by an urging member.

The back surface portion 16c is a plate-shaped portion that supports the tape 60 from the rear side. The tape holding portions 16e protrude forward from both sides of the back surface portion 16c. The tape holding portions 16e are configured to hold the tape 60 in accordance with the back surface portion 16c. In the embodiment, a pair of tape holding portions 16e are provided at each of two upper and lower parts, and four tape holding portions 16e are provided. Each of the tape holding portions 16e is formed in a substantially L shape, and the pair of upper and lower tape holding portions 16e are disposed such that the front end portions thereof are opposed to each other. Thus, the slit 16b is formed between the opposing front end portions of the tape holding portions 16e. The slit 16b allows a gripping member 37, which will be described below, to enter into the guide path.

As illustrated in FIGS. 8A and 8B, the abutment portion 16d is formed at an upper end edge of the back surface portion 16c, contacts with an inclined surface 37d of the gripping member 37 which will be described below, and slides along the inclined surface 37d. The abutment portion 16d protrudes toward the front end portion in an R shape, and thus is formed so as not to contact with both side edges of the inclined surface 37d of the gripping member 37. The contact with the edges of the inclined surface 37d is prevented, and thus when the tape 60 is sandwiched and pulled by the abutment portion 16d and the gripping member 37 as will be described below, it is prevented that a hole is generated in the tape 60 or the tape 60 is torn.

The cutting blade fitting portion 16f is configured to fix the cutting blade 17 for cutting the tape 60 after the binding of the objects S to be bound. As illustrated in FIG. 6 and the like, the cutting blade 17 is attached to the cutting blade fitting portion 16f so as to form an angle with respect to the guide path of the tape 60 behind the guide path of the tape 60. When the cutting blade 17 is fixed to the tape guide 16 in this way and thus the tape guide 16 rocks, the cutting blade 17 rocks in conjunction with the tape guide 16.

That is, as illustrated in FIG. 12, the cutting blade 17 is disposed such that a cutting edge 17a is directed backward in normal times, but the cutting edge 17a moves to be directed upward as illustrated in FIG. 22 when cutting the tape 60. As described above, the cutting blade 17 according to the embodiment is exposed so that the cutting edge 17a faces the tape 60 when cutting the tape 60. In the embodiment, the tape 60 rocks in conjunction with the tape guide 16. However, for example, the tape guide 16 is formed to move in a straight direction, and the cutting blade 17 may move in the straight direction in conjunction with the tape guide 16. Further, a member in the vicinity of the cutting blade 17 such as the tape guide 16 or the staple magazine 12 may move instead of the movement of the cutting blade 17, and the cutting edge 17a of the cutting blade 17 may be exposed so as to face the tape 60.

As illustrated in FIG. 1, both sides of the tape guide 16 and the cutting blade 17 are covered with a sidewall 11b which is a part of the main handle 11, and as illustrated in FIGS. 2 and 6, the tape guide 16 and the cutting blade 17 are not exposed in a side view. In other words, the main handle 11 is provided with the sidewall 11b which is disposed so as to overlap with the cutting edge 17a of the cutting blade 17 in a side view. The sidewall 11b is disposed so as to constantly overlap with the cutting edge 17a of the cutting blade 17 in a side view regardless of the state of the cutting blade 17 (either before or after the cutting blade 17 has moved). Therefore, even when foreign materials are caught by the front end portion 11a of the main handle 11, the cutting blade 17 is not stuck by the foreign materials. A rear side of the sidewall 11b is an inclined portion 11c, so that even when the object S to be bound is sandwiched by the front end portion 11a of the main handle 11, the object S to be bound can be guided toward the rear side (the main handle 11 and an inner side of the clincher arm 30).

Figure 5:
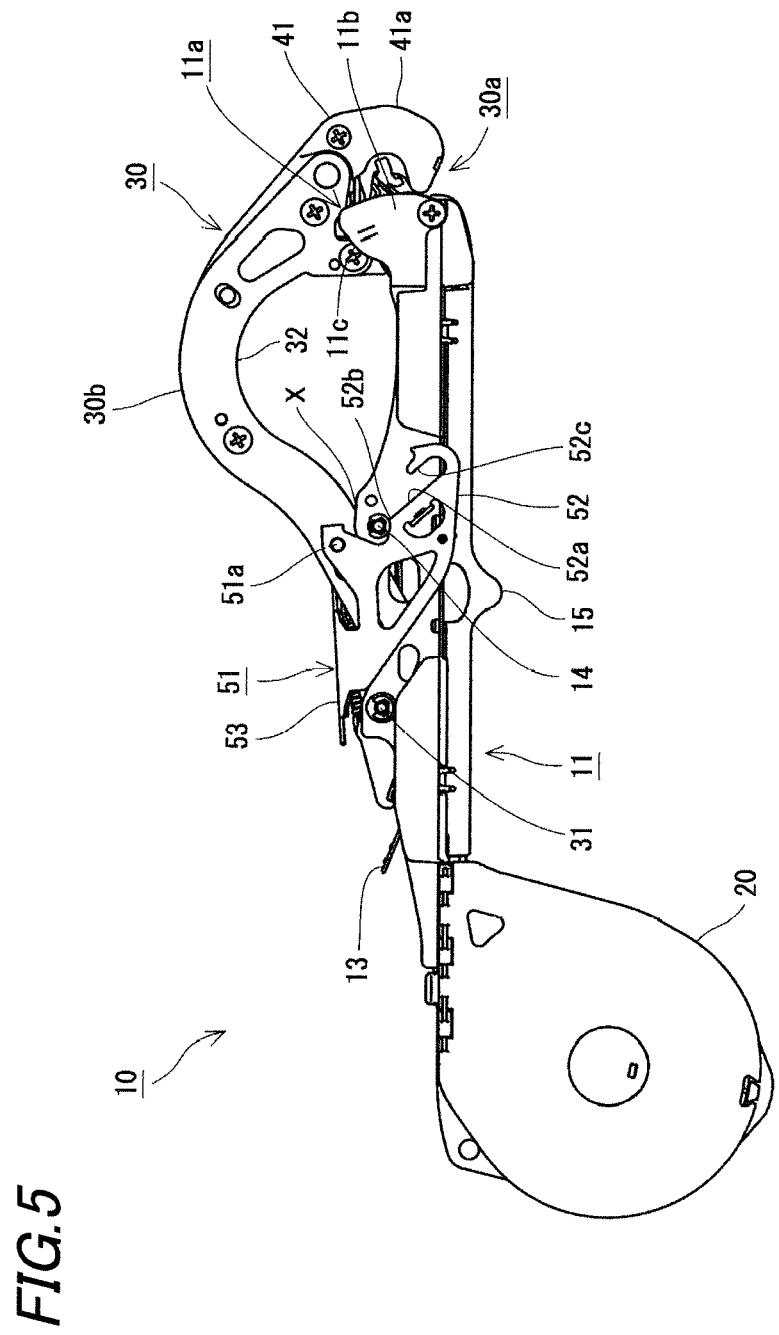
FIG. 5 is a side view of the binding machine for gardening from which the cover member of the operation handle is removed and illustrates a state in which the clincher arm is completely closed with respect to the main handle.

As illustrated in FIGS. 4 and 5, a roller-like engaging portion 14 is protrudingly formed on both sides of the main handle 11, and a finger hooking portion 15 is protrudingly formed on a lower surface of the main handle 11. The roller-like engaging portion 14 is a projection for slidably guiding a link portion 52 of the operation handle 50 which will be described below. The finger hooking portion 15 is a projection for hooking a finger squeezing the handle when the main handle 11 and the operation handle 50 are gripped.

As illustrated in FIG. 1 and the like, the clincher arm 30 is constituted by a pair of sheet metal members 30b connected to each other in parallel. The clincher arm 30 includes an arm portion 32 that extends curvedly toward the front end portion 30a so that a C-shaped opening can be formed between the clincher arm 30 and the main handle 11. The clincher arm 30 is rotatably attached to the main handle 11 by a rotating shaft 31 provided in the vicinity of the rear end.

The clincher 33, the tape gripping device 35, and a gripping device cover 41 are attached to the clincher arm 30.

The clincher 33 is fixed to the front end portion 30a of the clincher arm 30 so as to face the front end portion of the staple driver 18 described above. Thus, as illustrated in FIG. 22, when the staple 61 is ejected by the staple driver 18, the two legs of the ejected staple 61 are clinched by the clincher 33 and bent inward. When the clincher 33 bends the two legs of the staple 61 inward, so that the two legs bind the tape 60 and are thus bonded thereto.

The tape gripping device 35 is attached to the front end portion 30a of the clincher arm 30 and is capable of gripping the end 60a of the tape 60 drawn out from the front end portion 11a of the main handle 11. The tape gripping device 35 includes a support portion 36, a gripping member 37, a gripping member urging unit 38, a lock member 39, and a lock member urging unit 40.

Figure 9:
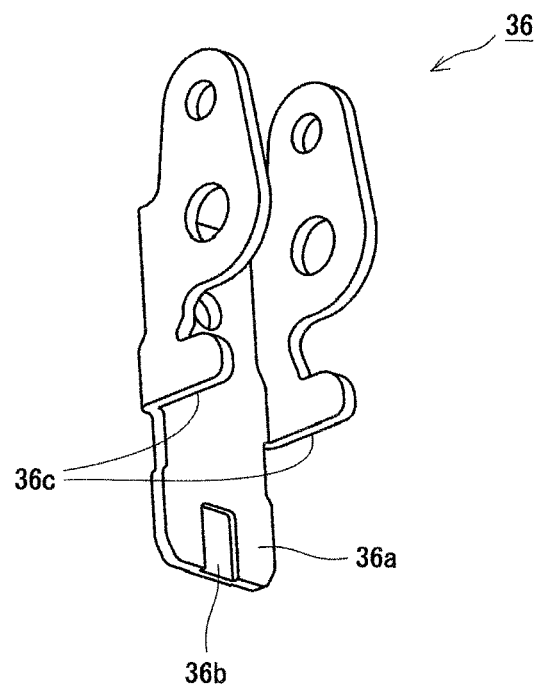
FIG. 9 is a perspective view of a support portion.

As illustrated in FIG. 6 and the like, the support portion 36 is fixed to the clincher arm 30 along the drawing direction of the tape 60, and includes a plate-like receiving portion 36a capable of supporting the rear surface of the tape 60. As illustrated in FIG. 9, a recessed portion 36b is formed in the receiving portion 36a. The recessed portion 36b is a portion to be engaged with a contact portion 37c of the gripping member 37 which will be described below, and has a groove narrower than the tape 60 and wider than the contact portion 37c. In addition, movement restricting portions 36c are protrudingly formed on both sides of the receiving portion 36a. The movement restricting portion 36c is provided to restrict the rotation of the clincher arm 30 by being brought into contact with tape guide 16.

Figure 10:
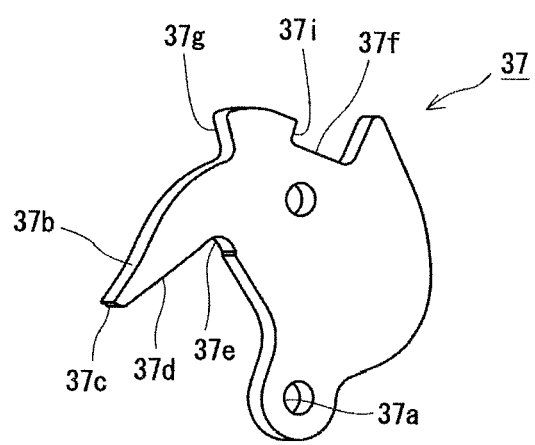
FIG. 10 is a perspective view of a gripping member.

The gripping member 37 is provided so as to face the support portion 36, and is provided movably toward the support portion 36 so as to grasp the tape 60. As illustrated in FIG. 10, the gripping member 37 includes a rotating shaft hole 37a, a claw portion 37b, a contact portion 37c, an inclined surface 37d, a V-shaped portion 37e, a peripheral surface 37f, a locked portion 37g, and a rotation blocking portion 37i.

The rotating shaft hole 37a is a hole through which a gripping member rotating shaft 42 penetrates. When the gripping member rotating shaft 42 penetrates through the rotating shaft hole 37a, the gripping member 37 is pivotally supported to be rotatable with respect to the clincher arm 30.

The claw portion 37b is a protruding portion for grasping the tape 60 in accordance with the receiving portion 36a of the support portion 36. The contact portion 37c capable of entering into the above-described recessed portion 36b is formed at a front end portion of the claw portion 37b. Thus, when the gripping member 37 is operated, the tape 60 can be firmly gripped by the concave-convex members (recessed portion 36b and contact portion 37c) through which the support portion 36 and the gripping member 37 are engaged with each other. That is, when the tape 60 is gripped with the concave-convex members, an intermediate part of the tape 60 is in a state of being pushed into the groove of the recessed portion 36b. In this state, a restoring force of the bent tape 60 is applied on the edge of the recessed portion 36b, so that a frictional force becomes larger and thus the tape 60 is difficult to come off.

The surface of the claw portion 37b on the main handle 11 side forms the inclined surface 37d. The inclined surface 37d is disposed to face the abutment portion 16d of the tape guide 16, and is provided to guide the abutment portion 16d of the tape guide 16 in contact therewith. Further, the V-shaped portion 37e is provided on the side opposite to the front end portion of the inclined surface 37d. The V-shaped portion 37e is configured such that the tape guide 16 sliding along the inclined surface 37d cannot further slide, and is formed to have an angle with respect to the inclined surface 37d.

In addition, the locked portion 37g and the rotation blocking portion 37i are provided on the peripheral surface 37f of the gripping member 37 on the opposite side of the main handle 11. The locked portion 37g and the rotation blocking portion 37i are formed using projections protrudingly formed on the peripheral surface 37f of the gripping member 37, and are configured to be engaged with the lock member 39 to be described below. The lock member 39 moves along the peripheral surface 37f of the gripping member 37, and can be engaged with the locked portion 37g or the rotation blocking portion 37i depending on circumstances.

The gripping member urging unit 38 is configured to urge the gripping member 37 toward the support portion 36. The gripping member urging unit 38 according to the embodiment is a torsion coil spring as illustrated in FIG. 7 and the like. When the gripping member urging unit 38 urges the gripping member 37 and thus the lock operation of the lock member 39 to be described below is released, the gripping member 37 operates, and the tape 60 can be gripped between the support portion 36 and the gripping member 37 from both sides thereof.

Figure 11A:
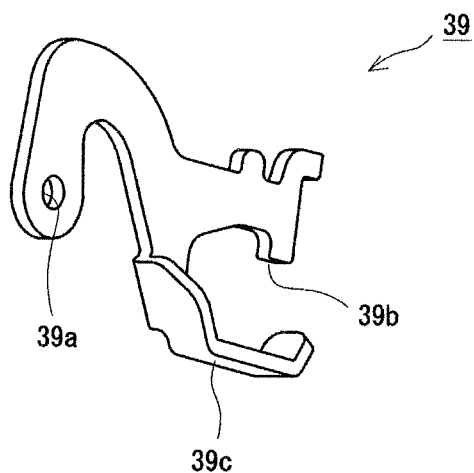
FIGS. 11A and 11B are a perspective view and a side view of a lock member, respectively.
Figure 11B:
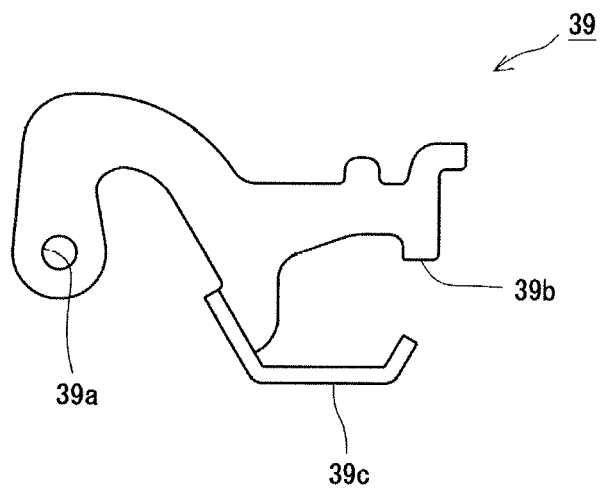

The lock member 39 is configured to hold the gripping member 37 at a standby position against an urging force of the gripping member urging unit 38 by being engaged with the gripping member 37. The lock member 39 includes a rotating shaft hole 39a, a locking portion 39b, and a pressed portion 39c as illustrated in FIGS. 11A and 11B.

The rotating shaft hole 39a is a hole through which the lock member rotating shaft 43 penetrates. The lock member rotating shaft 43 penetrates through the rotating shaft hole 39a, so that the lock member 39 is pivotally supported to be rotatable with respect to the clincher arm 30.

Figure 18:
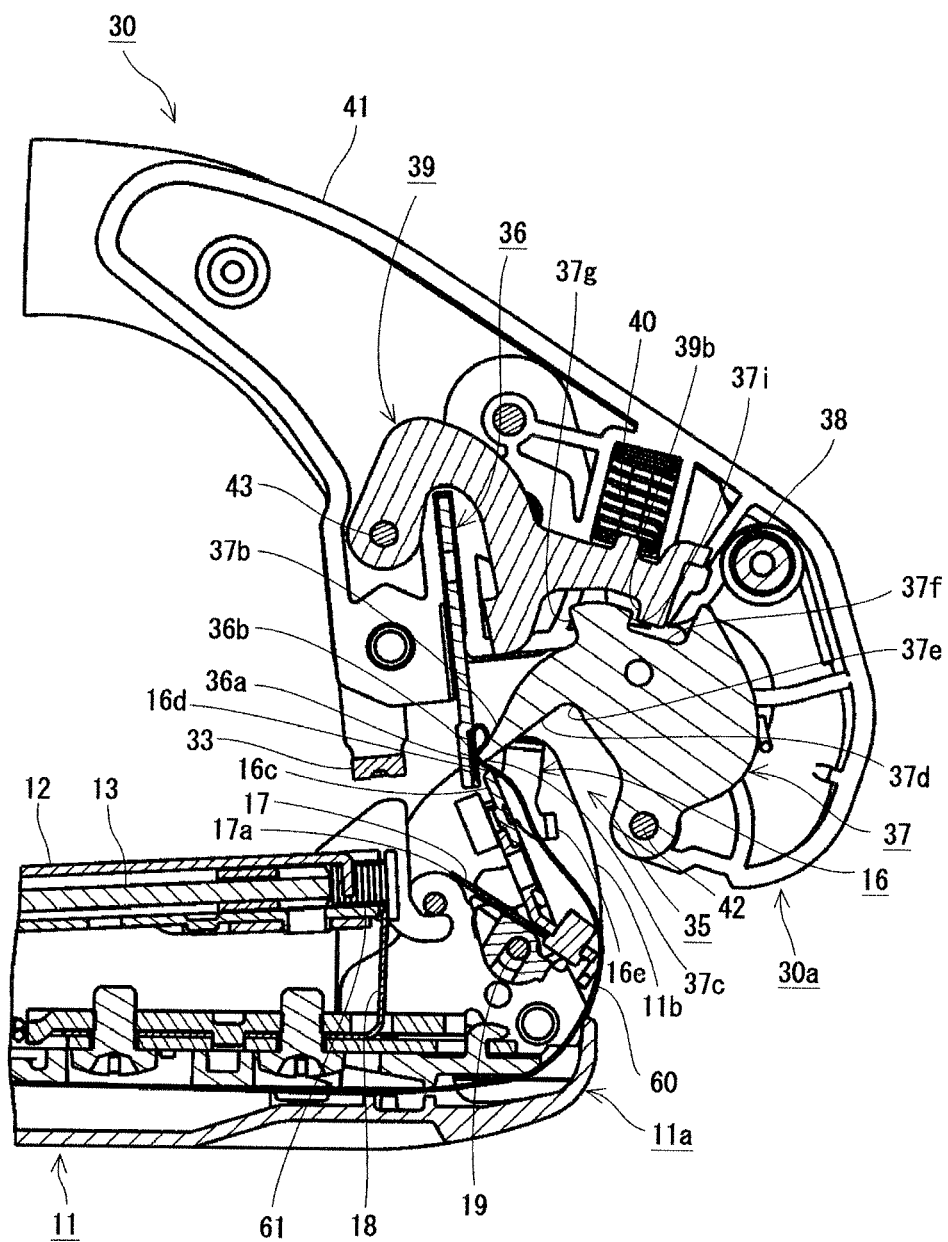
FIG. 18 is a partially enlarged sectional view of the binding machine for gardening and illustrates a state in which the gripping member grips a tape in accordance with the support portion.

The locking portion 39b is a portion for restricting movement of the gripping member 37, and is protrudingly formed to be engageable with the gripping member 37. As illustrated in FIG. 6 and the like, the locking portion 39b is disposed to face the peripheral surface 37f of the gripping member 37, and is engageable with the locked portion 37g and the rotation blocking portion 37i formed on the peripheral surface 37f. Specifically, the locking portion 39b is engaged with the locked portion 37g, so that the tape gripping device 35 can take a standby state of being opened without gripping the tape 60 as illustrated in FIG. 12. Then, when the lock member 39 rotates and thus the locking portion 39b is disengaged from the locked portion 37g, as illustrated in FIG. 18, the tape gripping device 35 can take a gripping state of being closed with the gripping of the tape 60. In the gripping state, the locking portion 39b faces the rotation blocking portion 37i so as to be engageable therewith, and thus the movement of the gripping member 37 is blocked. The rotation blocking portion 37i faces the locking portion 39b, so that the tape gripping device 35 maintains the gripping state until the lock member 39 rotates again.

The pressed portion 39c is a portion that is pushed up when the lock member 39 rocks, and is arranged so as to face the front end portion of the tape guide 16 as illustrated in FIG. 7 and the like. With this arrangement, the tape guide 16 pushes the lock member 39 against the urging force of the lock member urging unit 40 to be described below when the clincher arm 30 rotates in the closing direction with respect to the main handle 11.

The lock member urging unit 40 is configured to urge the lock member 39 in an engaging direction with the gripping member 37. The lock member urging unit 40 according to the embodiment is a compression spring as illustrated in FIG. 7 and the like. The lock member urging unit 40 urges the lock member 39, so that the locking portion 39b of the lock member 39 is constantly urged in an engaging direction with the locked portion 37g or the rotation blocking portion 37i.

The gripping device cover 41 is a cover that covers the tape gripping device 35 described above, and is fixed between two sheet metal members 30b of the clincher arm 30 as illustrated in FIGS. 12 and 13. The gripping device cover 41 according to the embodiment is constituted by split pieces that can be split in left and right directions, and accommodates the tape gripping device 35 therein. The gripping device cover 41 has an opening at a lower side, and the receiving portion 36a and the claw portion 37b of the tape gripping device 35 are disposed at the back of the opening. As illustrated in FIG. 12, the gripping device cover 41 includes a forward protruding portion 41a that covers the front side of the tape gripping device 35. Since the forward protruding portion 41a protrudes forward from the front end portion of the sheet metal member 30b, when the clincher arm 30 is inserted between crops, only the forward protruding portion 41a formed in a curved shape comes in contact with the crops, but the tape gripping device 35 does not come in contact with the crops.

As illustrated in FIGS. 2 to 5, the operation handle 50 includes a base member 51 fixed to the main body of the binding machine for gardening 10 and a cover member 55 detachable from the base member 51.

The base member 51 is a metal component acting directly on the main handle 11 and the clincher arm 30. The base member 51 is attached to the clincher arm 30 so as to be rotatable about a rotation fulcrum 51a as illustrated in FIGS. 4 and 5. Then, the base member 51 includes the link portion 52 engaged with the main handle 11 at one side thereof as viewed from the rotation fulcrum 51a and a handle support portion 53 at the other side thereof as viewed from the rotation fulcrum 51a. The handle support portion 53 is attached with the cover member 55, thereby functioning as a lever operation portion 55c.

The link portion 52 is engaged with the main handle 11 and serves as a point of application of a lever. A hook 52c is formed at the front end portion of the link portion 52, and the hook 52c is engaged with the roller-like engaging portion 14 of the main handle 11, whereby the clincher arm 30 maintains a state of being opened at a predetermined angle with respect to the main handle 11 as illustrated in FIG. 4.

From this state, when the operation handle 50 and the main handle 11 are gripped, as illustrated in FIG. 5, the hook 52c is disengaged from the roller-like engaging portion 14, and the roller-like engaging portion 14 slides on a sliding surface 52a formed on a front surface of the link portion 52. In this way, as the sliding surface 52a slides along the roller-like engaging portion 14, the clincher arm 30 rotates in the closing direction with respect to the main handle 11. An inclination of the sliding surface 52a used for the engagement of the roller-like engaging portion 14 changes stepwise in order to reduce an operation load when the staple 61 is ejected. That is, the inclination of the sliding surface 52a becomes larger at the time of the binding operation rather than at the time of the gripping operation, so that a larger force can be obtained at the time of the binding operation even with the same operation load. Thus, the binding operation requiring a large force can be also performed with a light operation load. In this way, since the inclination of the sliding surface 52a changes, a projection 52b is formed in a place where the inclination of the sliding surface 52a changes.

As illustrated in FIG. 2 and the like, the cover member 55 covers the base member 51 so as to prevent it from being exposed. All the contact portions or the operation portions with/of the outside of the operation handle 50 are covered with the cover member 55. The cover member 55 includes a hook cover 55a and a lever operation portion 55c.

The hook cover 55a covers the link portion 52 and a crossing portion X (see FIGS. 4 and 5) between the main handle 11 and the clincher arm 30. On the side surface of the hook cover 55a, a curved projection 55b is provided along the finger squeezing the lever operation portion 55c and the main handle 11 as illustrated in FIG. 1 and the like. When the curved projection 55b is provided, the operation handle 50 is easily gripped and can be held with a light grip even when the machine is held upward.

The lever operation portion 55c covers the handle support portion 53, and is gripped by an operator when the operation handle 50 is operated. When the lever operation portion 55c is gripped in a direction approaching the main handle 11, the base member 51 rotates about the rotation fulcrum 51a, and the link portion 52 acts on the main handle 11, whereby the main handle 11 and the clincher arm 30 rotate in the closing direction with respect to each other.

A method of using the binding machine for gardening 10 will be described below.

When the binding work is performed using the binding machine for gardening 10, first, the lock member 39 and the gripping member 37 are engaged with each other as illustrated in FIGS. 12 and 13, thereby setting the gripping member 37 to be in the standby state.

Figure 14:
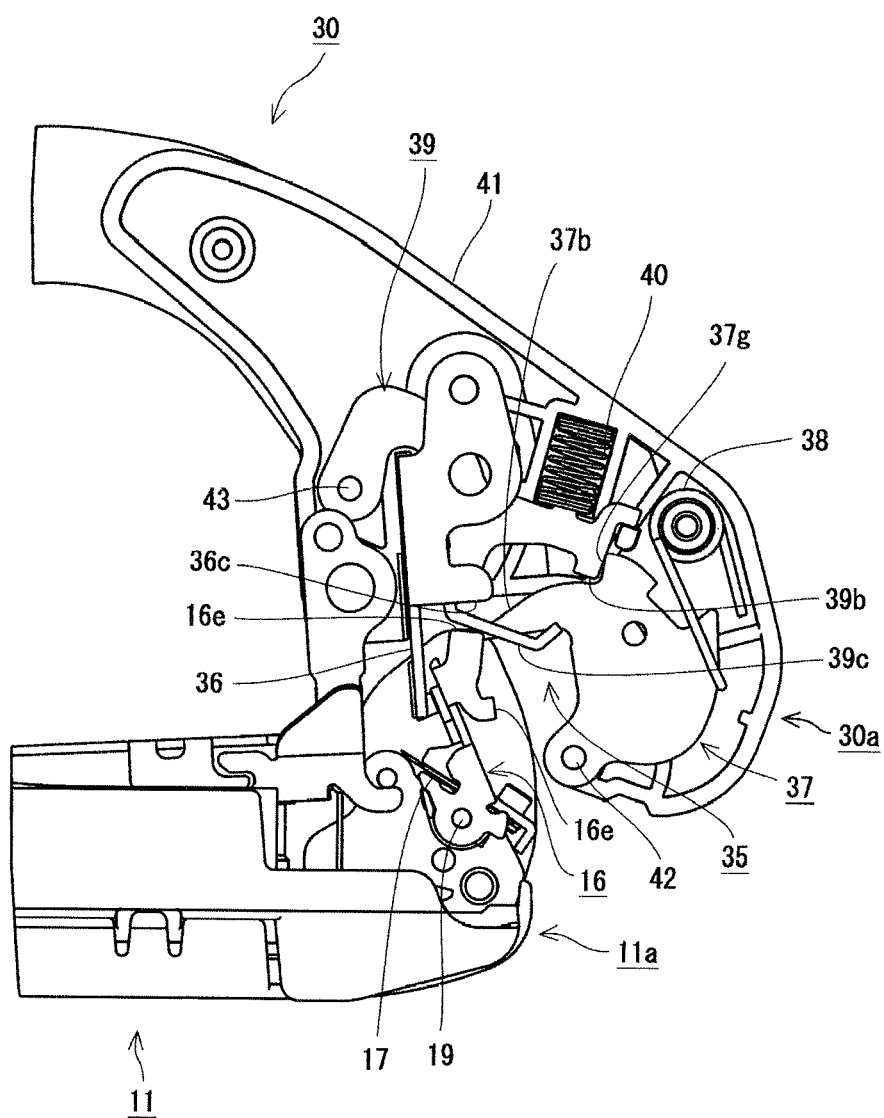
FIG. 14 is a view for explaining a relation between the tape guide and the lock member and the support portion and illustrates a state before the tape guide comes in contact with the lock member and the support portion.

In this state, when the handle is gripped and the clincher arm 30 rotates in the closing direction with respect to the main handle 11, the tape holding portion 16e of the tape guide 16 comes in contact with the pressed portion 39c of the lock member 39 as illustrated in FIG. 14.

Figure 15:
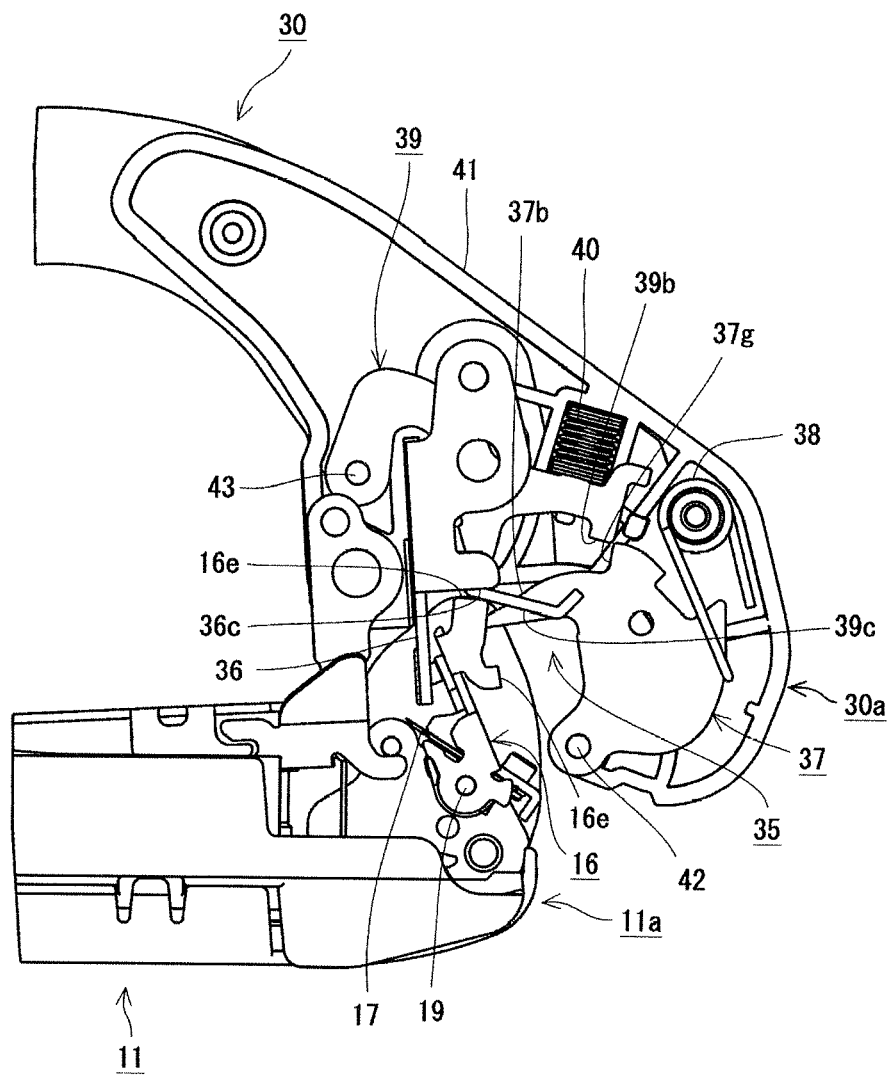
FIG. 15 is a view for explaining the relation between the tape guide and the lock member and the support portion and illustrates a state in which the tape guide pushes up the lock member.

When the clincher arm 30 further rotates, the lock member 39 is pushed up to rotate as illustrated in FIG. 15. As the lock member 39 rotates, the locking portion 39b of the lock member 39 is disengaged from the locked portion 37g of the gripping member 37 and the gripping member 37 rotates. Thus, the claw portion 37b of the gripping member 37 is pressed against the back surface portion 16c of the tape guide 16, and the end 60a of the tape 60 drawn out from the tape guide 16 is gripped in the guide path of the tape guide 16.

Figure 16:
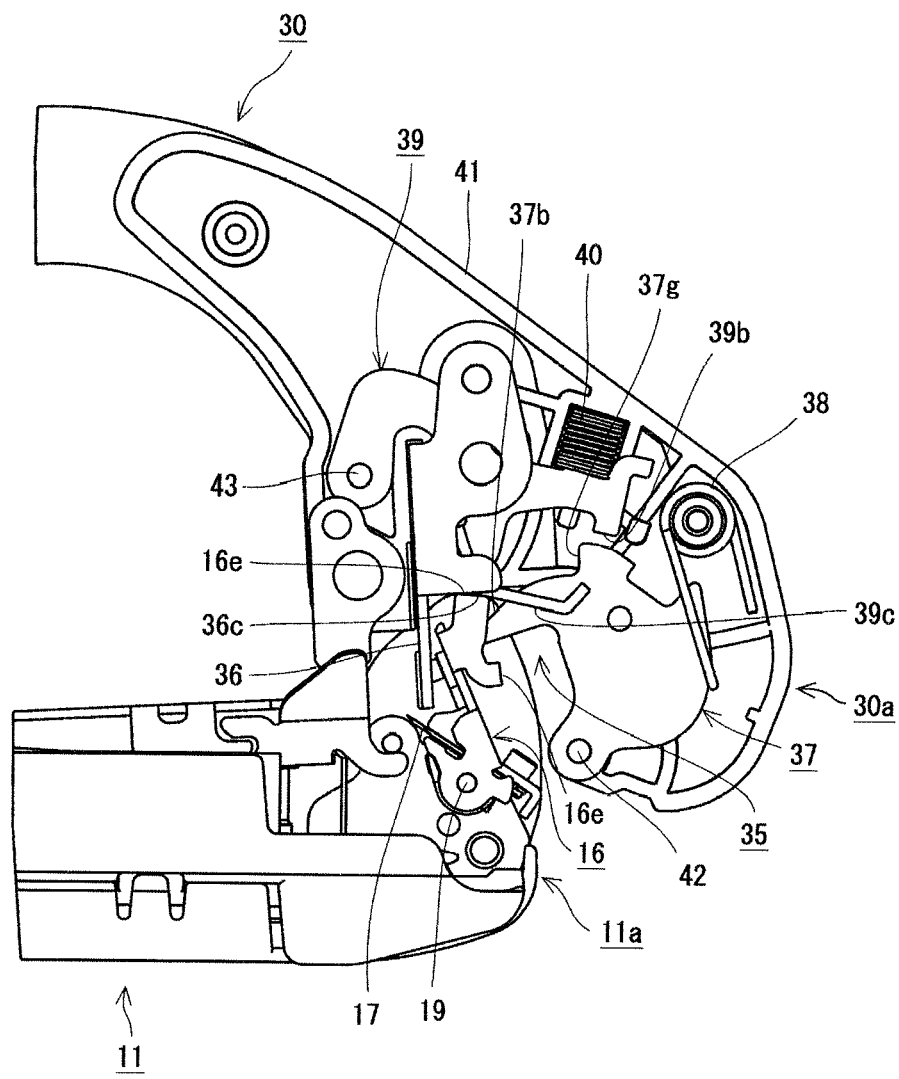
FIG. 16 is a view for explaining the relation between the tape guide and the lock member and the support portion and illustrates a state in which the tape guide abuts on the support portion.

At this time, when the clincher arm 30 further rotates, the tape holding portion 16e of the tape guide 16 comes in contact with the movement restricting portion 36c of the support portion 36 as illustrated in FIG. 16. In this way, the tape guide 16 functions as a movement restricting unit for restricting the rotation of the clincher arm 30 in the embodiment. Thus, the rotation of the clincher arm 30 is restricted, and thus the clincher arm 30 can hardly rotate up to a completely closed state (a closed state in which the binding operation is executed). Whether the tape guide 16 restricts the rotation of the clincher arm 30 is automatically switched according to the state of the tape gripping device 35. That is, when the tape gripping device 35 is in the standby state, the rotation of the clincher arm 30 is restricted as described above, but when the tape gripping device 35 is in the gripping state, the tape guide 16 acts on the tape gripping device 35 (which will be described below in detail), and thus the clincher arm 30 moves up to a position where the rotation thereof is not restricted (see FIG. 21).

Figure 17:
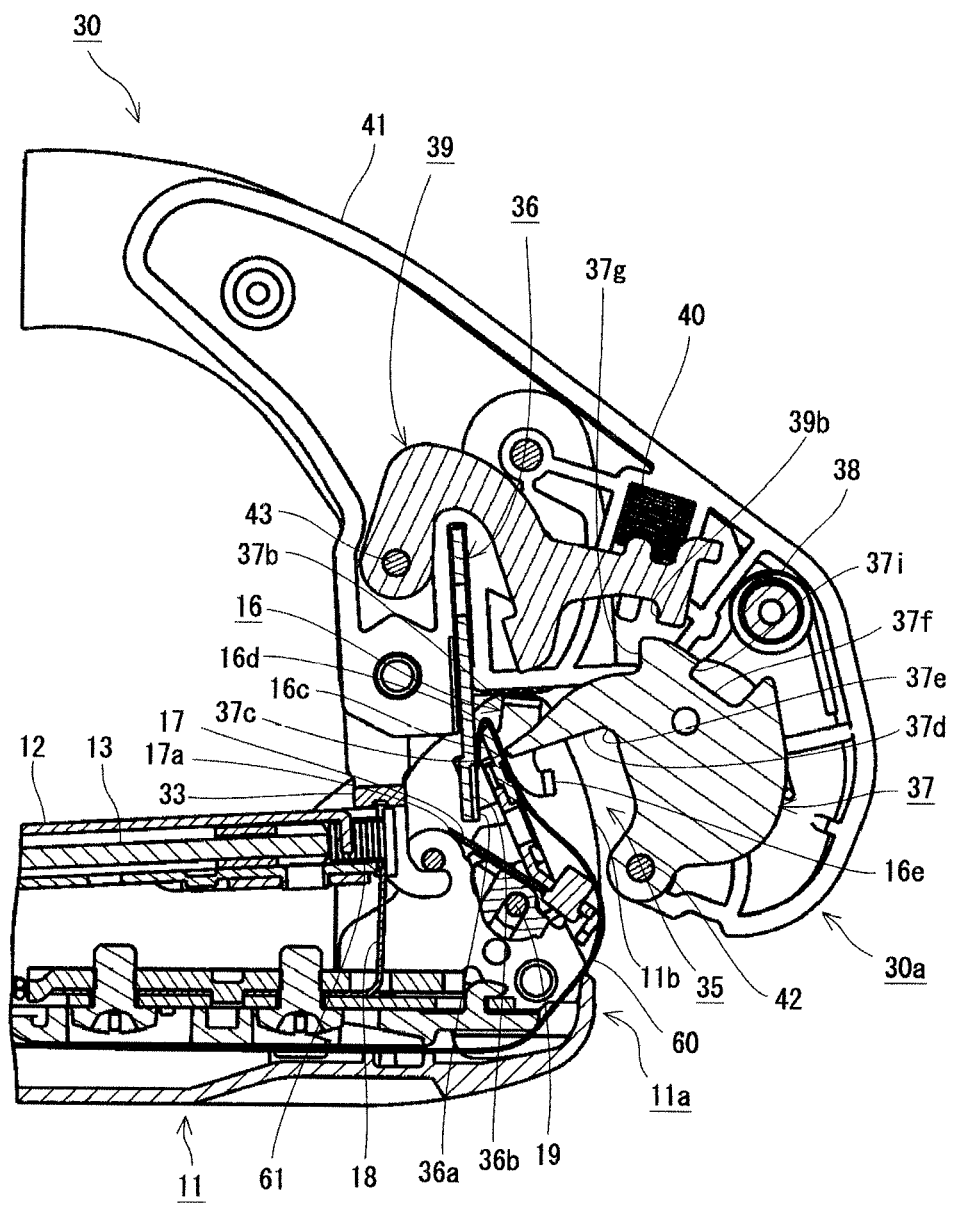
FIG. 17 is a partially enlarged sectional view of the binding machine for gardening and illustrates a state in which the gripping member grips a tape in accordance with the tape guide.

When the first squeezing operation is performed in this way, as illustrated in FIG. 17, the gripping member 37 enters into the guide path of the tape guide 16 and grips the tape 60 in the guide path in accordance with the back surface portion 16c of the tape guide 16. In this state, when the squeezing of the handle is released and the clincher arm 30 rotates in the opening direction with respect to the main handle 11, as illustrated in FIG. 18, the gripping member 37 slides and passes in the guide path in a state of gripping the tape 60 and grips the tape 60 in accordance with the support portion 36 after passing through the guide path.

Further, when the clincher arm 30 rotates in the opening direction with respect to the main handle 11, as illustrated in FIG. 19, the front end portion 30a of the clincher arm 30 and the front end portion 11a of the main handle 11 are separated from each other in a state of gripping the tape 60, and the tape 60 is in a state of being stretched between the clincher arm 30 and the main handle 11.

Figure 20:
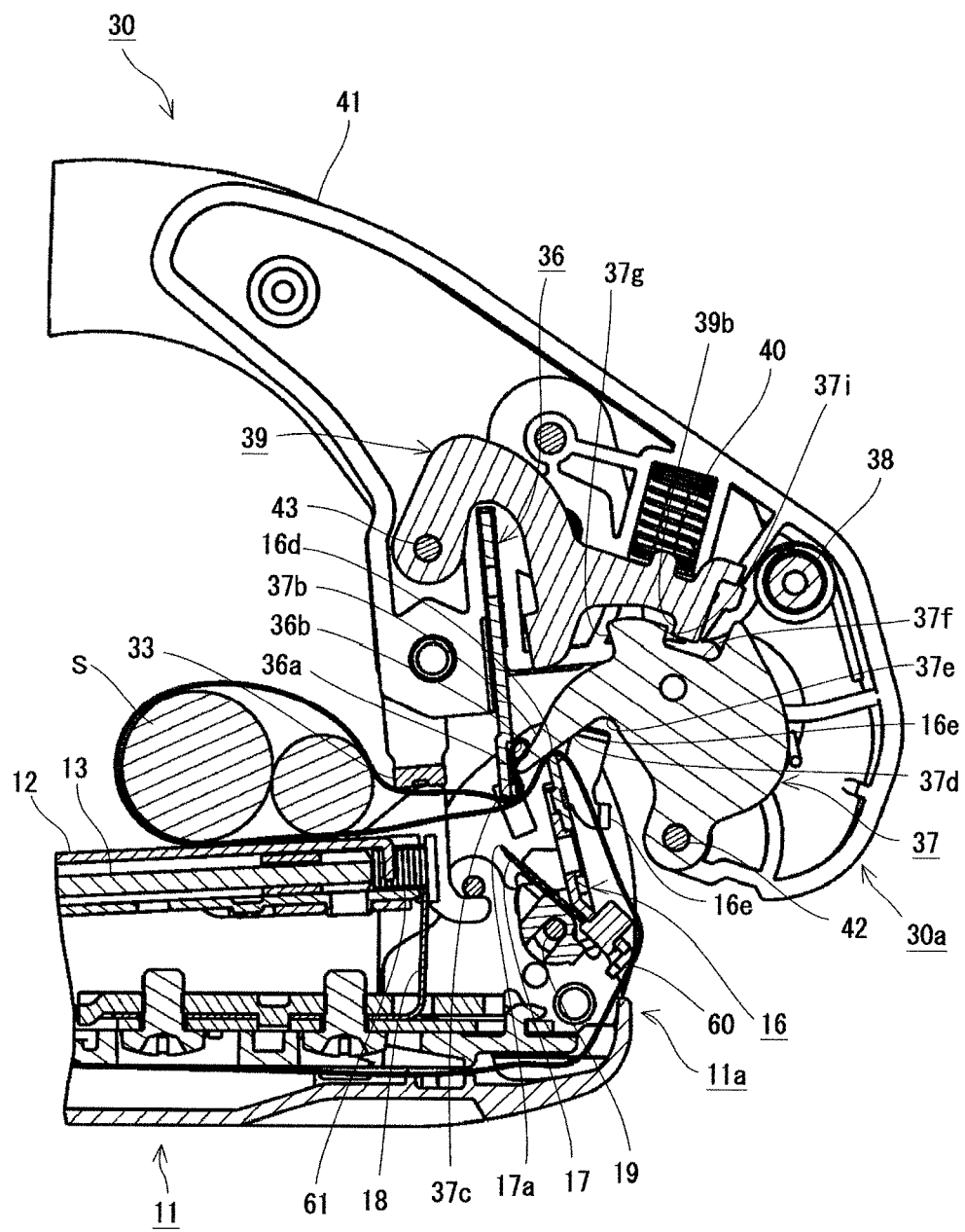
FIG. 20 is a partially enlarged sectional view of the binding machine for gardening and illustrates a state in which the tape guide is in contact with the gripping member.

In this state, when the objects S to be bound such as seedlings or branches are introduced from the outside of the stretched tape 60 and the clincher arm 30 rotates in the closing direction, as illustrated in FIG. 20, a tape loop is formed to bind the objects S to be bound.

Figure 23:
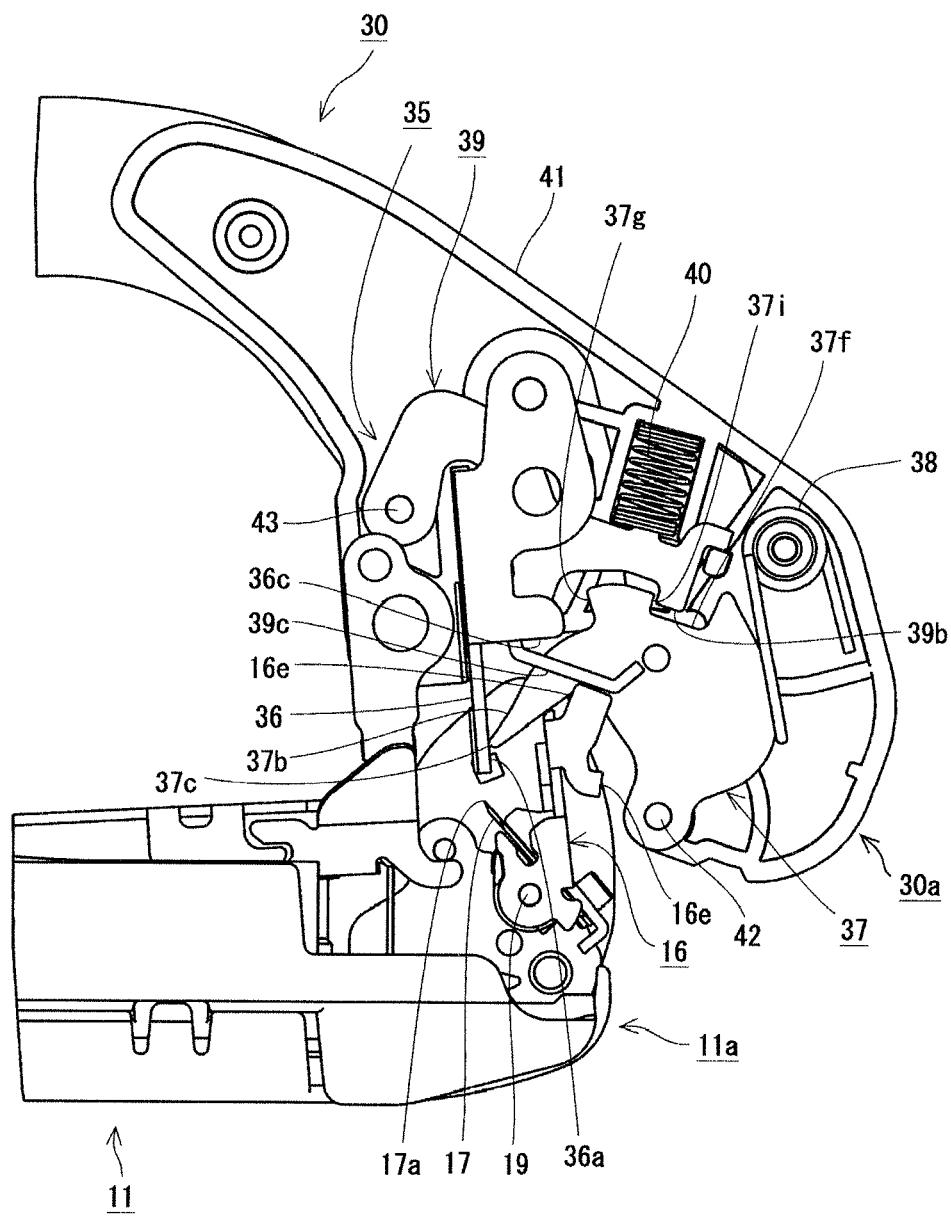
FIG. 23 is a view for explaining how the gripping member moves together with the tape guide, and illustrating a state where the tape guide moves along an inclined surface of the gripping member.

From the state illustrated in FIG. 20, when the handle is further gripped and the clincher arm 30 rotates in the closing direction with respect to the main handle 11, the abutment portion 16d of the tape guide 16 abuts on the inclined surface 37d of the gripping member 37, and the abutment portion 16d is guided to the inclined surface 37d of the gripping member 37 and moves forward. As the tape guide 16 moves forward as described above, the tape guide 16 is retracted to a position where the tape holding portion 16e does not come in contact with the movement restricting portion 36c of the support portion 36. When the tape guide 16 is retracted, the restriction of the rotation of the clincher arm 30 due to the tape guide 16 is released, and the clincher arm 30 is rotatable up to a completely closed state (a closed state where the binding operation is executed). In a state where the tape guide 16 starts to move, as illustrated in FIG. 23, the locking portion 39b of the lock member 39 faces the rotation blocking portion 37i of the gripping member 37, and the movement of the gripping member 37 is restricted.

Figure 21:
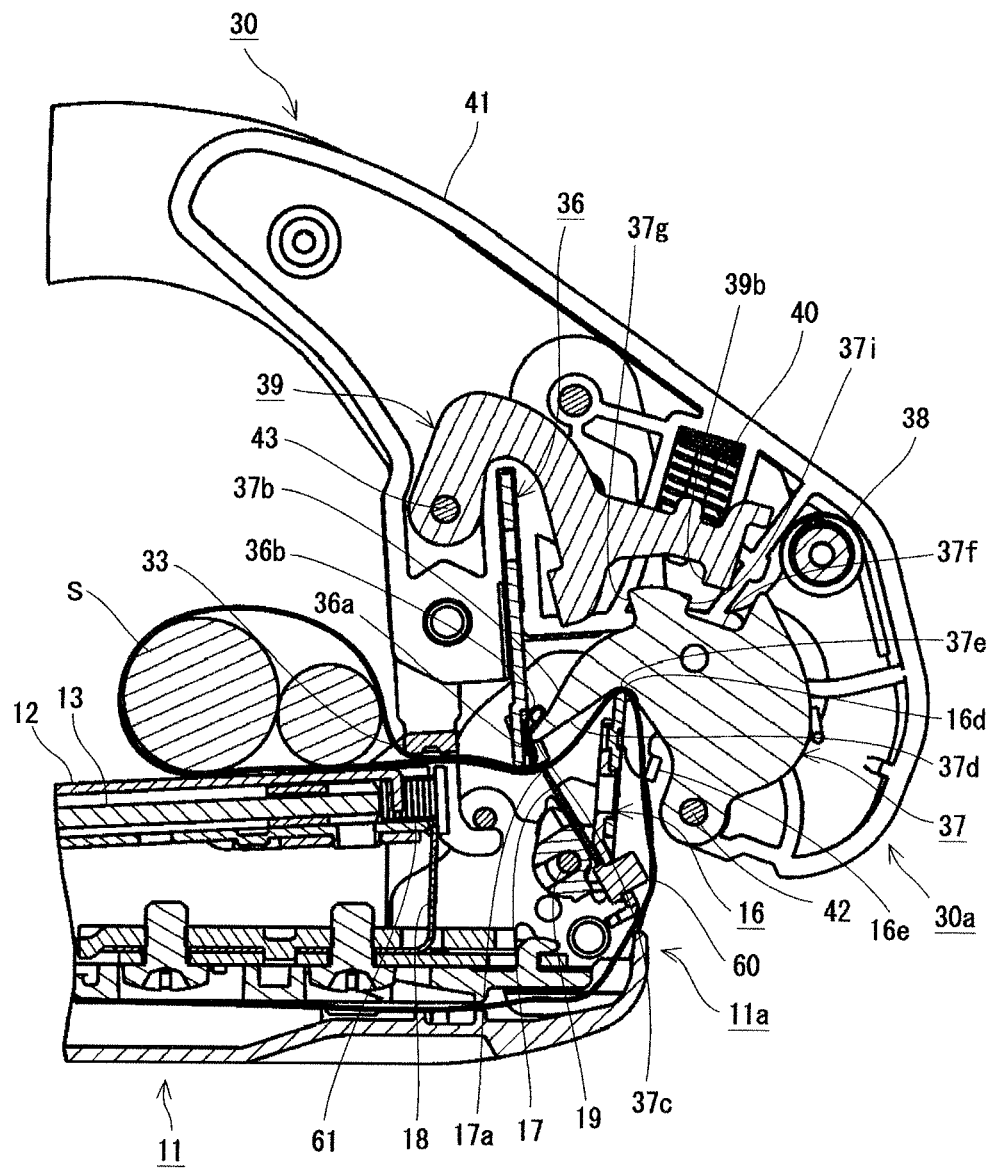
FIG. 21 is a partially enlarged sectional view of the binding machine for gardening and illustrates a state in which the tape guide moves along an inclined surface of the gripping member.

Then, as illustrated in FIG. 21, the tape guide 16 rocks forward until the abutment portion 16d is engaged with the V-shaped portion 37c ahead of the inclined surface 37d.

Figure 24:
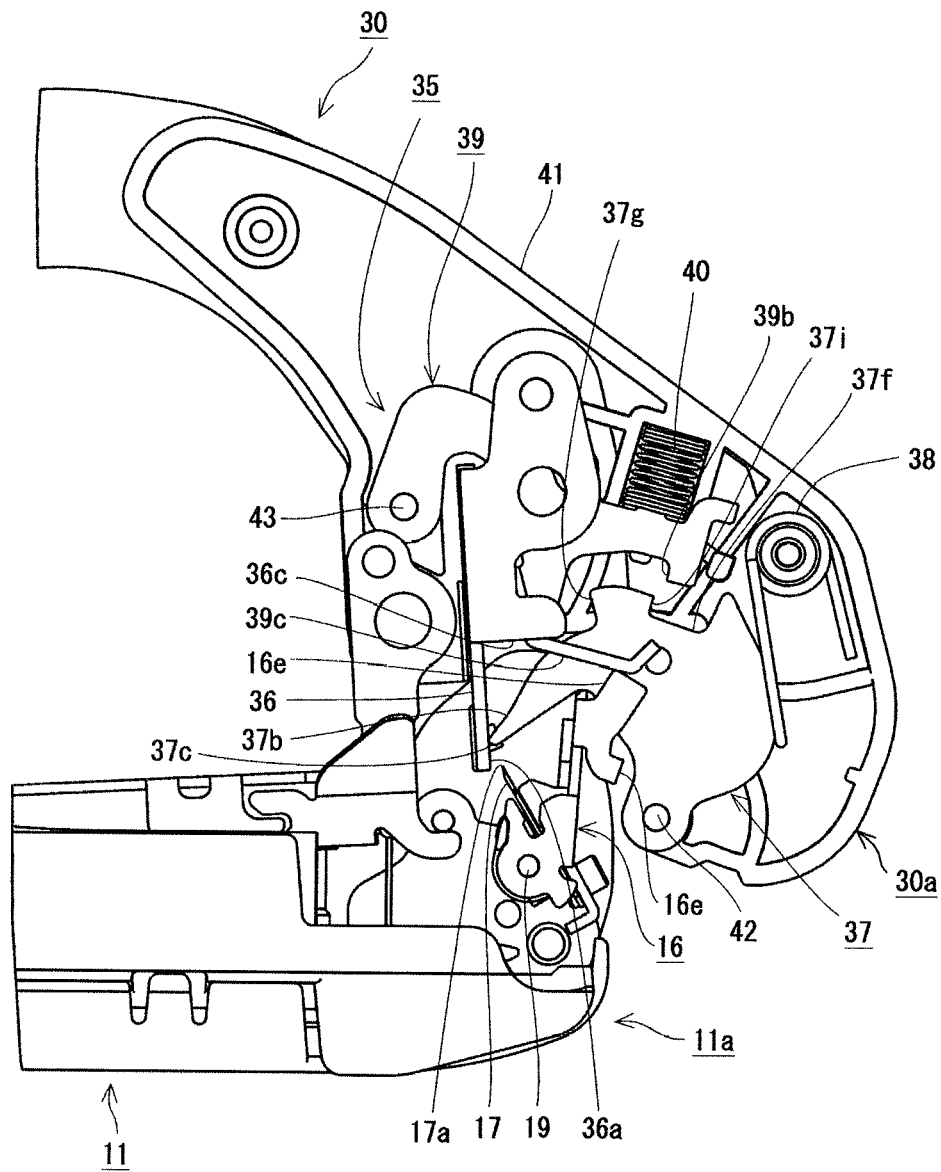
FIG. 24 is a view for explaining how the gripping member moves together with the tape guide, and illustrating a state where the tape guide is engaged with a V-shaped portion of the gripping member.

When the abutment portion 16d is engaged with the V-shaped portion 37e in this way, the tape guide 16 and the gripping member 37 hold the tape 60 in accordance with each other. As illustrated in FIG. 24, immediately before the abutment portion 16d is engaged with the V-shaped portion 37e, the tape holding portion 16e of the tape guide 16 pushes up the pressed portion 39c of the lock member 39 to rock the lock member 39. Thus, the movement restriction of the gripping member 37 is released.

From the state illustrated in FIG. 21, when the handle is further gripped and the clincher arm 30 rotates in the closing direction with respect to the main handle 11, as illustrated in FIG. 22, the tape guide 16 and the gripping member 37 collapse forward together. At this time, since the tape guide 16 moves while holding the tape 60, tension is applied to the tape 60. As the gripping member 37 moves together with the tape guide 16, the tape 60 is detached from the tape gripping device 35. However, since the detached tape 60 is pressed from below by the tensioned tape 60, it is not disengaged from the front-end portion 30a of the clincher arm 30. Then, as the tape guide 16 rocks, the cutting blade 17 fixed to the tape guide 16 rocks in a direction in which the cutting blade 17 approaches the tape 60, and the tensioned tape 60 is cut. At the same time, the staple 61 is ejected behind the cutting blade 17 by the staple driver 18.

Figure 25:
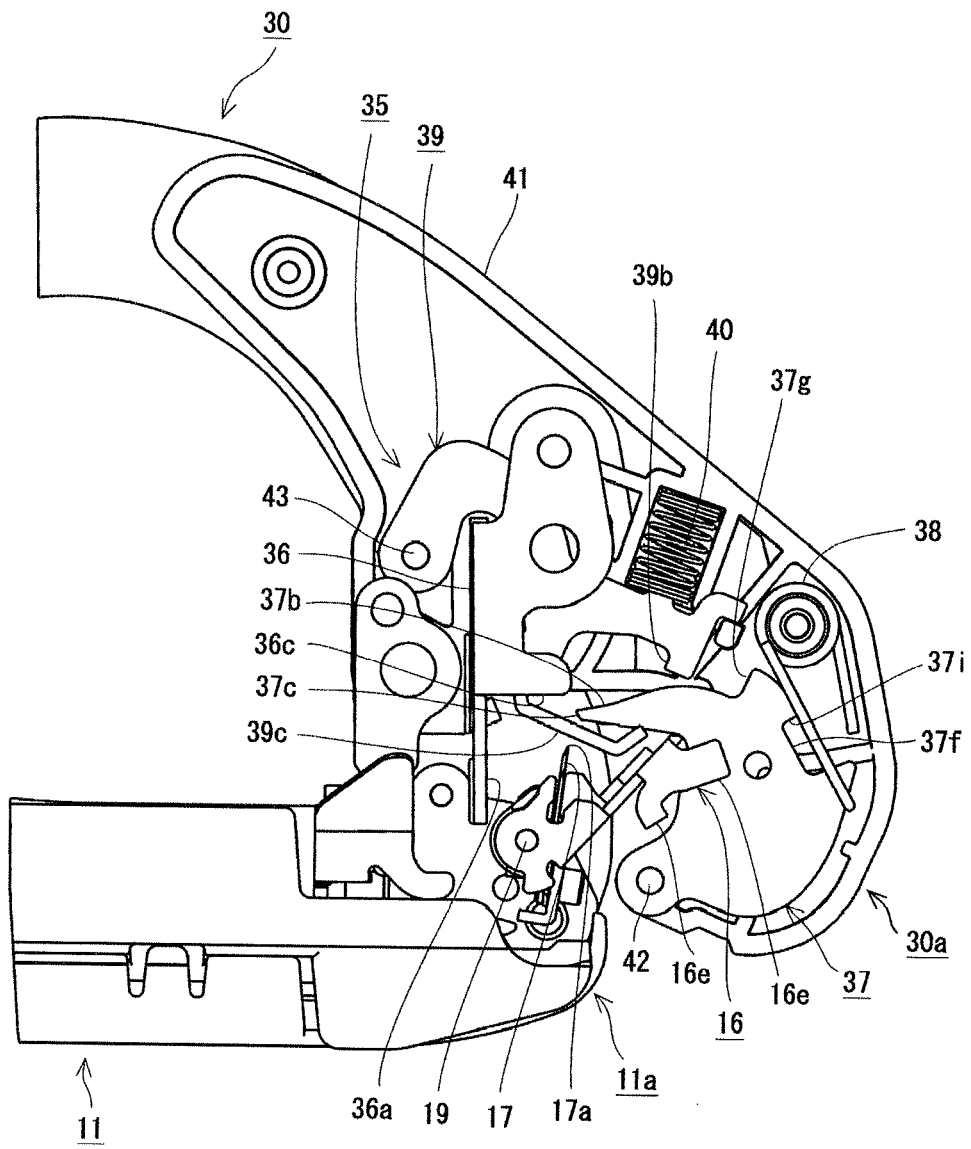
FIG. 25 is a view for explaining how the gripping member moves together with the tape guide, and illustrating a state where the gripping member has moved together with the tape guide.

As illustrated in FIG. 25, in the course of rotating the clincher arm 30 in the closing direction with respect to the main handle 11, the tape holding portion 16e of the tape guide 16 is disengaged from the pressed portion 39c of the lock member 39. For this reason, the force pushing up the lock member 39 disappears, so that the lock member 39 moves by the urging force of the lock member urging unit 40, and becomes engageable with the gripping member 37. In addition, the gripping member 37 moves together with the tape guide 16, and thus moves to the front side compared to the standby state.

Finally, when the squeezing of the handle is released and the clincher arm 30 rotates in the opening direction with respect to the main handle 11, as illustrated in FIG. 12, the gripping member 37 is engaged with the lock member 39 and the tape gripping device 35 is in a standby state. In this way, the binding machine for gardening 10 returns to the initial state, and the first binding work is completed.

As described above, according to the embodiment, the tape guide 16 is attached so as to be movable between a first position and a second position to be described below. That is, when the tape gripping device 35 operates to grip the end 60a of the tape 60, as illustrated in FIG. 17, the tape guide 16 is located in the first position adjacent to the support portion 36 such that the front end portion of the tape guide 16 faces the receiving portion 36a of the support portion 36. On the other hand, when the cutting blade 17 operates to cut the tape 60, as illustrated in FIG. 22, the front end portion of the tape guide 16 moves forward, and the tape guide 16 is located in the second position apart from the support portion 36. In this way, the tape guide 16 is movable such that the position (first position) when the tape gripping device 35 operates to grip the end 60a of the tape 60 and the position (second position) when the cutting blade 17 operates to cut the tape 60 are different from each other. According to this configuration, the distance between the tape gripping device 35 and the tape guide 16 can be made short as much as possible when the tape 60 is gripped by the tape gripping device 35, so that it is possible to prevent the gripping failure of the tape gripping device 35. In addition, the distance between the tape gripping device 35 and the tape guide 16 can be made long when the tape 60 is cut by the cutting blade 17, so that it is possible to cut the tape 60 after securing a sufficient gripping margin from a drawing port. Therefore, it is possible to surely grip the tape 60 by the tape gripping device 35 in the work after the cutting. Further, since the tape 60 is not necessary to be disposed obliquely with respect to the cutting blade 17 in order to secure the gripping margin as in the related art, the tape 60 can be substantially brought into vertical contact with the cutting blade 17, and the defective cutting of the tape 60 can be prevented.

In addition, the tape guide 16 is swingably attached to the main handle 11. According to this configuration, the tape 60 can be guided toward the front end portion of the tape guide 16 from the tape guide rocking shaft 19, and even when the tape guide 16 rocks, since the tape guide rocking shaft 19 on the pulling out side of the tape 60 does not move, the tape 60 is not loosened or drawn along with the movement of the tape guide 16. Accordingly, it is possible to stably hold the tape 60 even when the tape guide 16 moves.

In addition, the tape guide 16 is configured to move while holding the tape 60 so as to apply a tension to the tape 60 cut by the cutting blade 17. According to this configuration, when the tape 60 is cut by the cutting blade 17, the tape guide 16 moves not only to secure the gripping margin but also to apply the tension to the tape 60, whereby the tape 60 can be easily cut and the defective cutting of the tape 60 can be prevented.

Further, the tape guide 16 is configured to move while being guided to the inclined surface 37d of the gripping member 37, and to further move together with the gripping member 37 after being engaged with the V-shaped portion 37e ahead of the inclined surface 37d. According to this configuration, since the gripping member 37 moves together with the tape guide 16, the gripping member 37 can be moved to the initial position (a state where the tape 60 is not gripped as illustrated in FIG. 12) using the movement of the tape guide 16. Moreover, since the gripping member 37 does not move until the tape guide 16 reaches the V-shaped portion 37e, it is possible to maintain a state where the tape 60 is gripped just before the cutting.

In addition, the restriction unit (lock member 39) is further provided to restrict the movement of the gripping member 37 when the tape guide 16 moves while being guided to the inclined surface 37d of the gripping member 37. According to this configuration, even when the tape guide 16 vigorously collides with the inclined surface 37d, it is possible to prevent the gripping member 37 from moving unintentionally. Accordingly, it is possible to prevent the tape 60 from being released at an unintended timing.

Further, the cutting blade 17 moves in conjunction with the tape guide 16. According to this configuration, the cutting blade 17 can hardly be damaged, and the defective cutting can be prevented. That is, if the cutting blade 17 is fixed to the main handle 11, as illustrated in FIG. 22, when the tape 60 is cut by the cutting blade 17, the tape guide 16 moves while pulling out the tape 60. Thus, the tape guide 16 moves to rub the surface of the tape 60 with the cutting edge 17a of the cutting blade 17. With such a movement, the cutting blade 17 may be damaged, or the defective cutting may occur. In this regard, when the cutting blade 17 moves together with the tape guide 16, the change in the relative position between the cutting edge 17a of the cutting blade 17 and the surface of the tape 60 can be reduced, and thus the above-described problem can hardly occur.

In the embodiment described above, the tape 60 is sandwiched and gripped by the tape gripping device 35, but the invention is not limited thereto. For example, even in the mechanism used in the related art in which the claw is thrust into the tape 60 to hold the tape 60, the same effect as this embodiment can be obtained.

In the embodiment described above, the tape guide 16 rocks, but the invention is not limited thereto. For example, the tape guide 16 may linearly move back and forth.

(1) A binding machine for gardening comprising:
  a main handle;
  a clincher arm that is rotatably attached to the main handle;
  a tape guide that is configured to draw out and guide a tape at a front end portion of the main handle;
  a tape gripping device that is configured to grip an end portion of the tape drawn out from the tape guide, at a front end portion of the clincher arm; and
  a cutting blade that is configured to cut the tape, wherein
  the tape guide is movably provided such that a position of the tape guide when the tape gripping device operates to grip the end portion of the tape and a position of the tape guide when the cutting blade operates to cut the tape are different from each other.

(2) The binding machine for gardening according to (1), wherein
  the tape guide is swingably attached to the main handle.

(3) The binding machine for gardening according to (1) or (2), wherein
  the tape guide is configured to move while holding the tape so as to apply a tension to the tape to be cut by the cutting blade.

(4) The binding machine for gardening according to (3), wherein
  the tape gripping device includes a gripping member that operates to grip the tape, and
  the tape guide is configured to be guided and to move by the gripping member.

(5) The binding machine for gardening according to (3), wherein
  the tape gripping device includes a gripping member that operates to grip the tape, and
  the tape guide is configured to move while being guided to an inclined surface of the gripping member toward a V-shaped portion of the gripping member, and to further move together with the gripping member after being engaged with a V-shaped portion.

(6) The binding machine for gardening according to (5), further comprising:
  a restriction unit that restricts movement of the gripping member when the tape guide moves and is guided to the inclined surface of the gripping member.

(7) The binding machine for gardening according to any one of (1) to (6), wherein
  the cutting blade moves in conjunction with the tape guide.

(8) The binding machine for gardening according to any one of (1) to (7), wherein
  the cutting blade is configured to be brought into vertical contact with the tape when the cutting blade cuts the tape.

What is claimed is:
1. A binding machine for gardening comprising:
  a main handle having a front end portion and a rear end portion;
  a clincher arm having a front end portion and a rear end portion, the clincher arm is rotatably attached to the main handle by a rotating shaft at the rear end portion of the clincher arm;

a tape guide that is configured to guide a tape at the front end portion of the main handle, wherein the tape guide is rotatably attached to the front end portion of the main handle and is rockable around a tape guide rocking shaft provided in the front end portion of the main handle;

a tape gripping device that is configured to grip an end portion of the tape guided by the tape guide, at the front end portion of the clincher arm, the tape gripping device including:

a support portion that is attached to the front end portion of the clincher arm; and a gripping member that is attached to the front end portion of the clincher arm and that faces the support portion, wherein the gripping member is movable toward the support portion so as to grip the tape; and a cutting blade that is configured to cut the tape, wherein the tape guide includes at least one tape holding portion disposed above and on a tape gripping device side of the tape guide rocking shaft, the at least one tape holding portion configured to confine the tape to a surface portion of the tape guide, and the at least one tape holding portion and the surface portion are rockable around the tape guide rocking shaft, and wherein the tape guide is movably provided such that a position of the tape guide when the tape gripping device operates to grip the end portion of the tape and a position of the tape guide when the cutting blade operates to cut the tape are different from each other.

2. The binding machine for gardening according to claim 1, wherein the tape guide is configured to move while holding the tape so as to apply a tension to the tape to be cut by the cutting blade.

3. The binding machine for gardening according to claim 2, wherein the tape guide is configured to be guided and to move by the gripping member.

4. The binding machine for gardening according to claim 2, wherein the tape guide is configured to move while being guided to an inclined surface of the gripping member toward a V-shaped portion of the gripping member, and to further move together with the gripping member after being engaged with the V-shaped portion.

5. The binding machine for gardening according to claim 4, further comprising:

a lock member configured to restrict movement of the gripping member when the tape guide moves and is guided to the inclined surface of the gripping member.

6. The binding machine for gardening according to claim 1, wherein the cutting blade moves in conjunction with the tape guide.

7. The binding machine for gardening according to claim 1, wherein the cutting blade is configured to be brought into vertical contact with the tape when the cutting blade cuts the tape.

8. The binding machine for gardening according to claim 1, further comprising:

a tape magazine provided at the rear end portion of the main handle, the tape magazine accommodating the tape.

9. The binding machine for gardening according to claim 1, wherein the tape guide includes a plurality of tape holding portions disposed above and on the tape gripping device side of the tape guide rocking shaft, the plurality of tape holding portions are configured to confine the tape to the surface portion of the tape guide, and the plurality of tape holding portions and the surface portion are rockable around the tape guide rocking shaft.

* * * * *